(12) United States Patent
Shibata et al.

(10) Patent No.: US 8,886,420 B2
(45) Date of Patent: Nov. 11, 2014

(54) CONTROL METHOD FOR AUTOMATIC TRANSMISSION, AND AUTOMATIC TRANSMISSION SYSTEM

(71) Applicant: Mazda Motor Corporation, Hiroshima (JP)

(72) Inventors: Tetsutaka Shibata, Hiroshima (JP); Kosuke Takegawa, Hatsukaichi (JP); Nobuyuki Sakata, Hiroshima (JP); Kazuo Sasaki, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 5 days.

(21) Appl. No.: 13/887,058

(22) Filed: May 3, 2013

(65) Prior Publication Data

US 2014/0149008 A1    May 29, 2014

(30) Foreign Application Priority Data

May 24, 2012    (JP) .................................. 2012-118850

(51) Int. Cl.
*G06F 7/00* (2006.01)
*F16H 61/04* (2006.01)
*F16H 59/02* (2006.01)
*F16H 63/42* (2006.01)
*F16H 61/02* (2006.01)

(52) U.S. Cl.
CPC ............ *F16H 61/0204* (2013.01); *F16H 61/04* (2013.01); *F16H 59/02* (2013.01); *F16H 63/42* (2013.01)
USPC .............................................. 701/52; 701/66

(58) Field of Classification Search
CPC ..... F16H 59/02; F16H 61/0204; F16H 63/42; F16H 61/04; B60W 2050/007; B60W 2050/0071
See application file for complete search history.

(56) References Cited

U.S. PATENT DOCUMENTS

| | | | |
|---|---|---|---|
| 5,882,277 A | 3/1999 | Iizuka | |
| 7,555,967 B2 * | 7/2009 | Terayama et al. | 74/336 R |
| 7,962,268 B2 * | 6/2011 | Cho | 701/51 |
| 8,271,167 B2 * | 9/2012 | Tawara et al. | 701/52 |
| 8,600,635 B2 * | 12/2013 | Wakita et al. | 701/66 |

FOREIGN PATENT DOCUMENTS

JP          10-089466 A        4/1998

* cited by examiner

*Primary Examiner* — David D Le
(74) *Attorney, Agent, or Firm* — Studebaker & Brackett PC

(57) ABSTRACT

A control method for an automatic transmission includes a step of canceling the shift performed by a shift operation for performing shifting in the same direction as that of the shifting performed by automatic shift control, when the shift operation is performed before the input revolution speed correlation value of the automatic transmission becomes a predetermined value, after the automatic shift control has been started in a manual shift mode, a step of switching a shift stage display at a timing at which the shift operation that is to be canceled has been performed, and a step of switching the shift stage display at a timing at which the input revolution speed correlation value becomes the predetermined value when a shift operation is not performed within a period of time from when the automatic shift control is started till when the input revolution speed correlation value becomes the predetermined value.

7 Claims, 17 Drawing Sheets

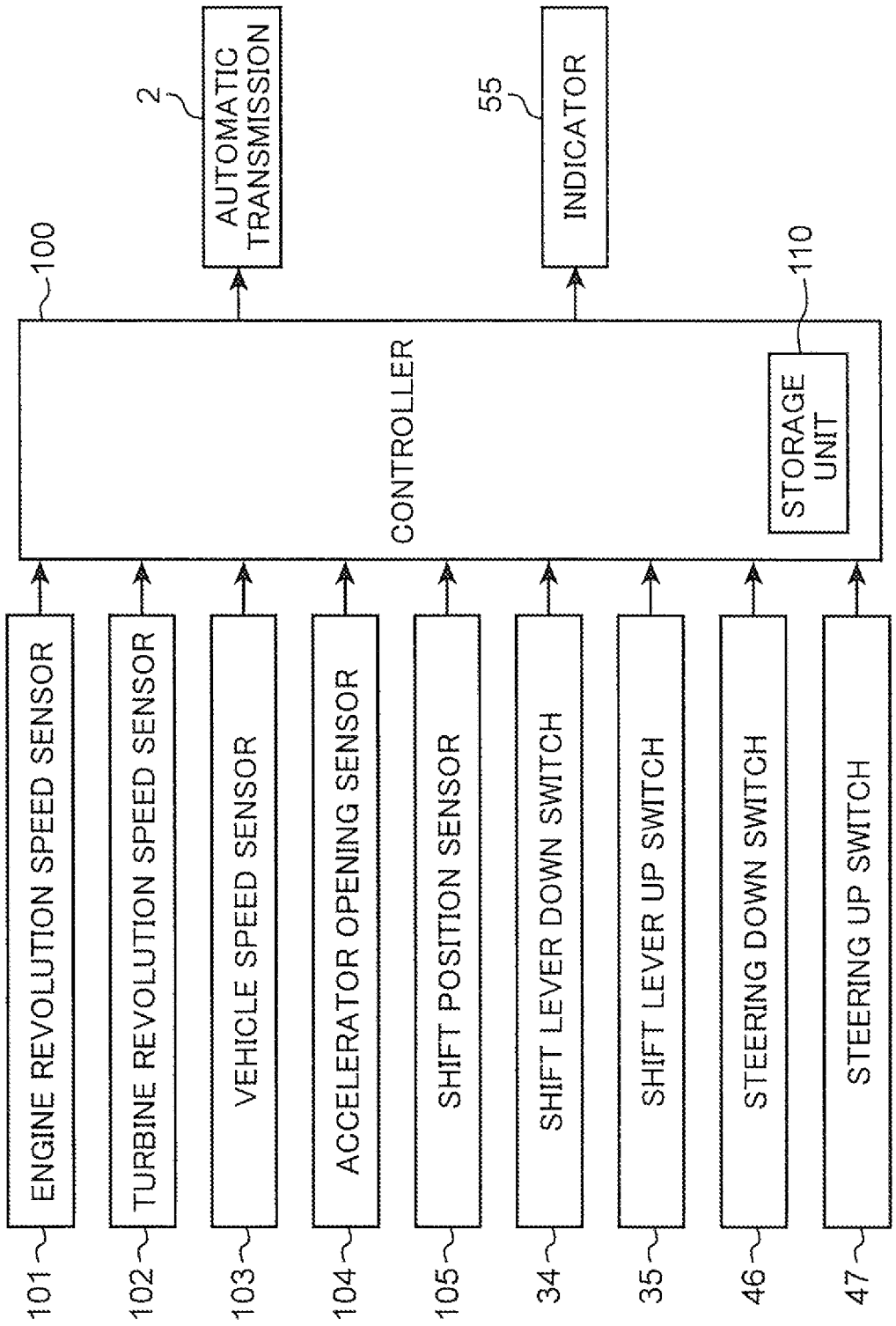

CONTROL METHOD FOR AUTOMATIC TRANSMISSION, AND AUTOMATIC TRANSMISSION SYSTEM

BACKGROUND OF THE INVENTION

1. Field of the Invention

The present invention relates to control of a vehicular automatic transmission equipped with a manual shift function and to a field of shifting technique in vehicles.

2. Description of the Related Art

Vehicular equipped with an automatic transmission that can be operated in an automatic shift mode in which the shift stages are shifted automatically according to the travel state, and a manual shift mode in which the shift stages are switched by a manual operation performed by a driver, have found practical use in recent years. When the manual shift mode is executed, the present shift stage is displayed by an indicator on an instrument panel. Further, the manual shift mode includes a manual mode executed by selecting, for example, a special shift range called "M range" by operating a shift lever, and a direct mode temporarily executed by operating an upshift switch or a downshift switch provided at a steering wheel.

Continuously variable transmissions (CVT) equipped with an automatic shift mode, in which the shift ratio is changed automatically according to the travel state, and a manual shift mode, in which the shift ratio is switched in a stepwise manner by a manual operation performed by the driver, have also been known. In a vehicle equipped with a continuously variable transmission of this kind, a plurality of shift stages are set in advance for the manual shift mode, and when the manual shift mode is executed, the present shift stage is displayed at the indicator.

For the sake of convenience of explanation, the term "automatic transmission" used hereinbelow will be assumed to include not only a multistep automatic transmission equipped with a mechanism for switching the shift ratio in a stepwise manner, but also a stepless automatic transmission equipped with a mechanism that continuously changes the shift ratio.

In the automatic transmission provided with such a manual shift function, a shift stage is basically selected by a manual operation performed by the driver when the manual shift mode is executed. However, in order to protect the engine, a shift stage is sometimes automatically shifted depending on the travel state even in the manual shift mode. More specifically, for example, an automatic upshift is executed when the engine revolution speed exceeds an upper limit value, and an automatic downshift is executed when the vehicle speed decreases and the engine revolution speed becomes lower than the lower limit value. The control by which upshifting and downshifting are thus automatically executed in the manual shift mode is referred to as "automatic shift control".

However, since shifting unintended by the driver is executed in the automatic shift control, the driver sometimes performs a shift operation while disregarding the execution of such shifting as the automatic shift control is performed, and in such cases, two-stage shifting is performed contrary to the driver's intention. For example, when the upshifting is automatically executed following the increase in the engine revolution speed as the vehicle travels at the first speed in the manual shift mode, where the driver upshifts to a second speed in the course of such control, the upshifting is performed to a third speed contrary to the driver's intention, and the driver is given an uncomfortable feeling, namely, the acceleration force expected by the driver is not obtained.

To resolve this problem, Japanese Patent Application Publication No. H10-89466 discloses the technique by which when upshifting is automatically executed in the manual shift mode, the execution of upshifting by the driver's operation is prohibited till a predetermined time elapses. With the technique disclosed in Japanese Patent Application Publication No. H10-89466, the execution of the two-stage upshifting contrary to the driver's intention in the manual shift mode can be prohibited.

However, with the technique disclosed in Japanese Patent Application Publication No. H10-89466, when the upshift operation is performed while the automatic upshift is executed in the manual shift mode, the shift stage display at the indicator is switched at the automatic upshift timing, rather than at the manual operation timing, and therefore the driver can be given an uncomfortable feeling.

Further, a general problem encountered when the automatic shift control is executed in the manual shift mode is that when the automatic shift control is executed, the shift stage display is switched when no shift is intended by the driver and the shift is not recognized. The resultant problem is that the driver is given an uncomfortable feeling, and this problem also remains unsolved by Japanese Patent Application Publication No. H10-89466 described above.

SUMMARY OF THE INVENTION

The present invention has been created to resolve this problem, and it is an object of the present invention to switch the shift stage display at a timing at which the driver is not given an uncomfortable feeling, while preventing the two-stage shifting from being executed contrary to the driver's intention in the course of automatic shift control in the manual shift mode.

The control method for an automatic transmission and the automatic transmission system in accordance with the present invention are configured in the following manner to attain the above-described object.

Thus, the present invention relates to a control method for an automatic transmission capable of performing switching between an automatic shift mode in which shifting is automatically performed according to a travel state of a vehicle, and a manual shift mode in which shifting is performed by a shift operation of a driver. This method includes an automatic shift step of executing automatic shift control by which shifting is automatically performed, regardless of the shift operation of the driver, when a predetermined condition is fulfilled in a state in which the manual shift mode is executed; a cancellation step of canceling a shift performed by a shift operation for performing shifting in the same direction as that of the shifting performed by the automatic shift control, when the shift operation is performed before an input revolution speed correlation value that varies as the shifting of the automatic transmission advances becomes a predetermined value, which has been set in advance as a value at the time the driver recognizes the shifting, after the automatic shift control has been started; a first display switching step of switching a shift stage display at a timing at which the shift operation that is to be canceled in the cancellation step has been performed, following the execution of the cancellation step; and a second display switching step of switching the shift stage display at a timing at which the input revolution speed correlation value becomes the predetermined value when a shift operation is not performed within a period of time from when the automatic shift control is started till when the input revolution speed correlation value becomes the predetermined value.

The present invention also relates to an automatic transmission system, including: an automatic transmission capable of performing switching between an automatic shift mode in which shifting is automatically performed according to a travel state of a vehicle, and a manual shift mode in which shifting is performed by a shift operation of a driver; a display device that displays a shift stage when the manual shift mode is executed; a shift operation detection device that detects the shift operation of the driver; an input revolution speed correlation value detection device that detects an input revolution speed correlation value that varies as the shifting of the automatic transmission advances; and a controller that controls the automatic transmission and the display device. The controller is configured to execute: a process of controlling the automatic transmission so as to execute automatic shift control by which shifting is automatically performed, regardless of the shift operation of the driver, when a predetermined condition is fulfilled in a state in which the manual shift mode is executed; a process of controlling the automatic transmission so as to cancel the shift performed by a shift operation for performing shifting in the same direction as that of the shifting performed by the automatic shift control, when the shift operation is performed before the input revolution speed correlation value becomes a predetermined value, which has been set in advance as a value at the time the driver recognizes the shifting, after the automatic shift control has been started; a process of controlling the display device so as to switch a shift stage display at a timing at which the shift operation that is to be canceled has been performed, following the shift cancellation process; and a process of controlling the display device so as to switch the shift stage display at a timing at which the input revolution speed correlation value becomes the predetermined value when a shift operation is not performed within a period of time from when the automatic shift control is started till when the input revolution speed correlation value becomes the predetermined value.

BRIEF DESCRIPTION OF THE DRAWINGS

FIG. 6 is a block diagram illustrating the automatic transmission system according to an embodiment of the present invention;

DESCRIPTION OF THE PREFERRED EMBODIMENTS

The embodiments of the control method for an automatic transmission and an automatic transmission system in accordance with the present invention will be explained below.

Figure 1:
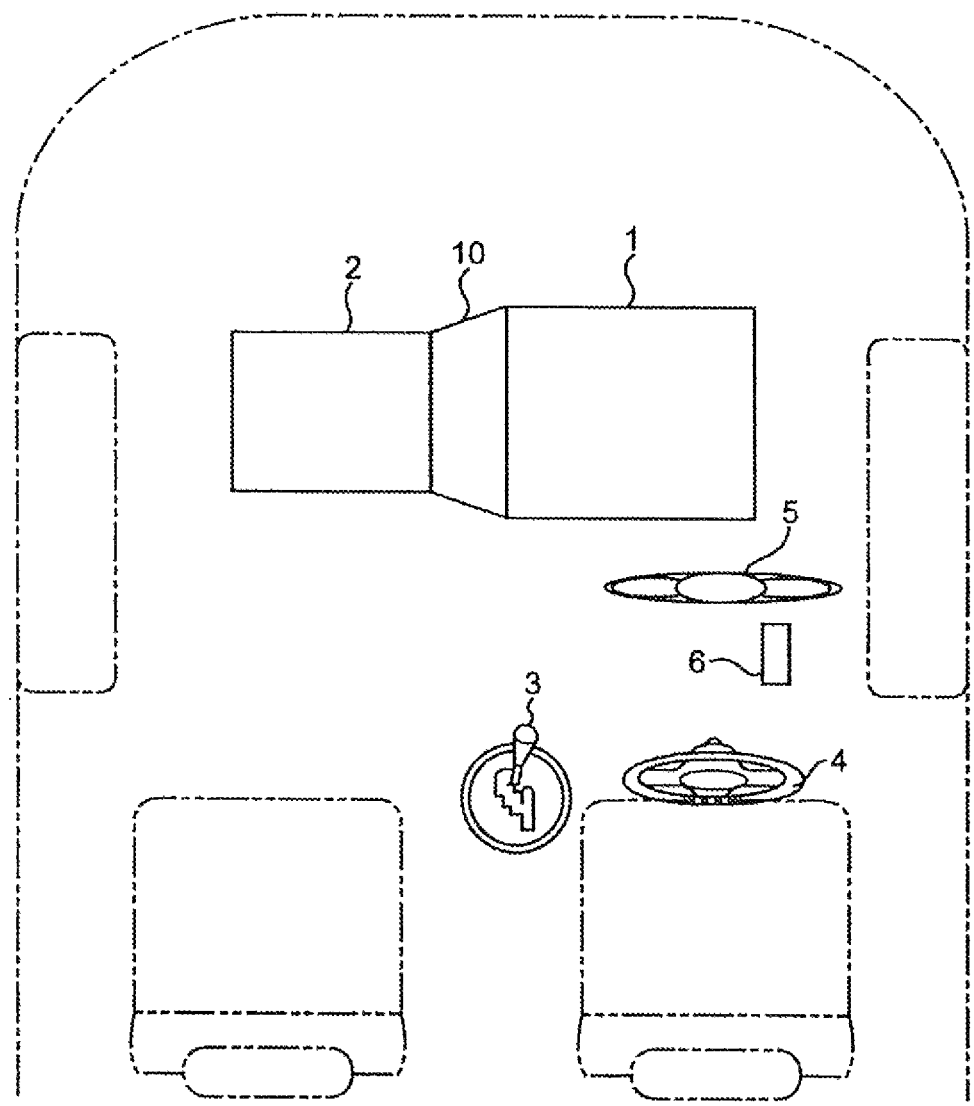
FIG. 1 is a schematic view of an automobile equipped with the automatic transmission using an embodiment of the present invention.

FIG. 1 is a schematic diagram of an automobile carrying an automatic transmission using the embodiment of the present invention. A power unit including an engine 1, an automatic transmission 2, and a torque converter 10 coupling the engine and the transmission is installed in the front section of the automobile. A shift lever 3 for switching the range of the automatic transmission 2 is provided at a side of a driver's seat inside a cabin.

The automatic transmission 2 can be switched between an automatic shift mode, in which shifting is performed automatically according to the travel state of the automobile, and a manual shift mode, in which shifting is performed by the shift operation of the driver. Further, in the present embodiment, the manual shift mode includes a manual mode which is continuously executed till the operation of changing to the automatic shift mode is performed, and a direct mode that is temporarily executed from after when the below-described predetermined operation is performed till when it is canceled by the fulfillment of a predetermined condition.

A steering wheel 4 is provided in front of the driver's seat inside the cabin, and a meter unit 5 is provided in an instrument panel located in front of the steering wheel 4. An accelerator pedal 6 is provided at the driver's feet.

Figure 2A:
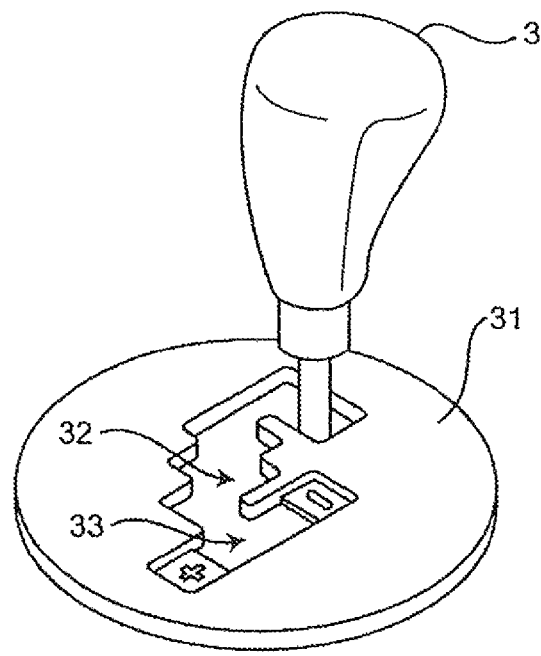
FIG. 2A is a perspective view of a shift lever.
Figure 2B:
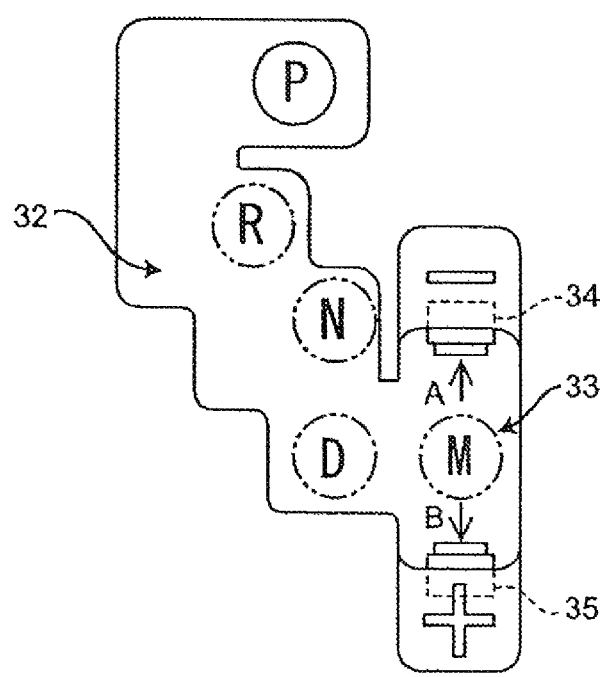
FIG. 2B is a plan view illustrating the operation position of the shift lever.

As shown in FIG. 2A, the shift lever 3 is operated along an operation path 32 provided in a guide member 31. As shown in FIG. 2B, a P range position, an R range position, an N range position, and a D range position are provided on the operation path 32. When the shift lever 3 is operated to the D drive position, the shift mode of the automatic transmission 2 is set to the automatic shift mode.

The M range position 33 is provided at a side of the D range position. When the shift lever 3 is operated from the D range position to the M range position 33, the shift mode of the automatic transmission 2 is shifted to the manual mode.

The M range position 33 has an operation region extending in the front-rear direction. Where the shift lever 3 is operated forward (direction of arrow A in FIG. 2B) from the central position located in the center of this operation region, the downshift switch (referred to hereinbelow as "shift lever down switch") 34 is set ON and the shift stage of the automatic transmission 2 is downshifted by one stage. Where the shift lever is operated rearward (direction of arrow B in FIG. 2B), the upshift switch (referred to hereinbelow as "shift lever up switch") 35 is set ON and the shift stage is upshifted by one stage. After the operation, the shift lever is returned to the neutral position to be ready for the next operation. The shift lever down switch 34 and the shift lever up switch 35 correspond to examples of "shift operation detection device" in accordance with the present invention.

Figure 3A:
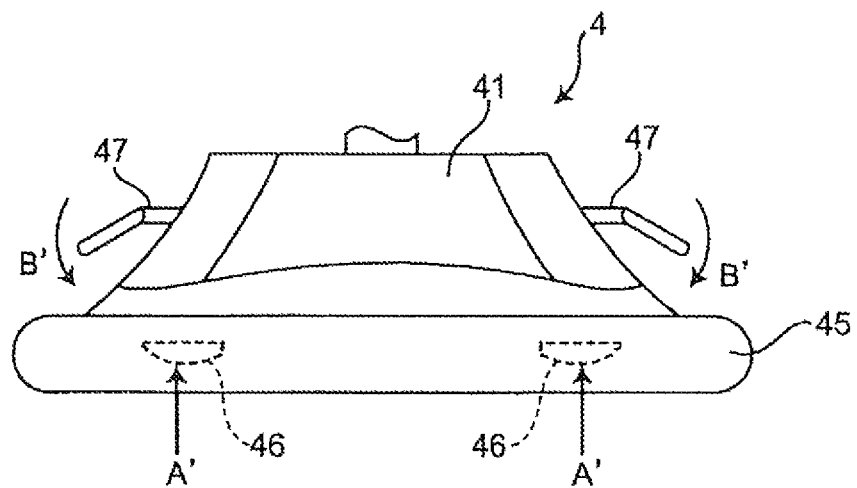
FIG. 3A is a plan view illustrating the arrangement of a steering down switch and a steering up switch.
Figure 3B:
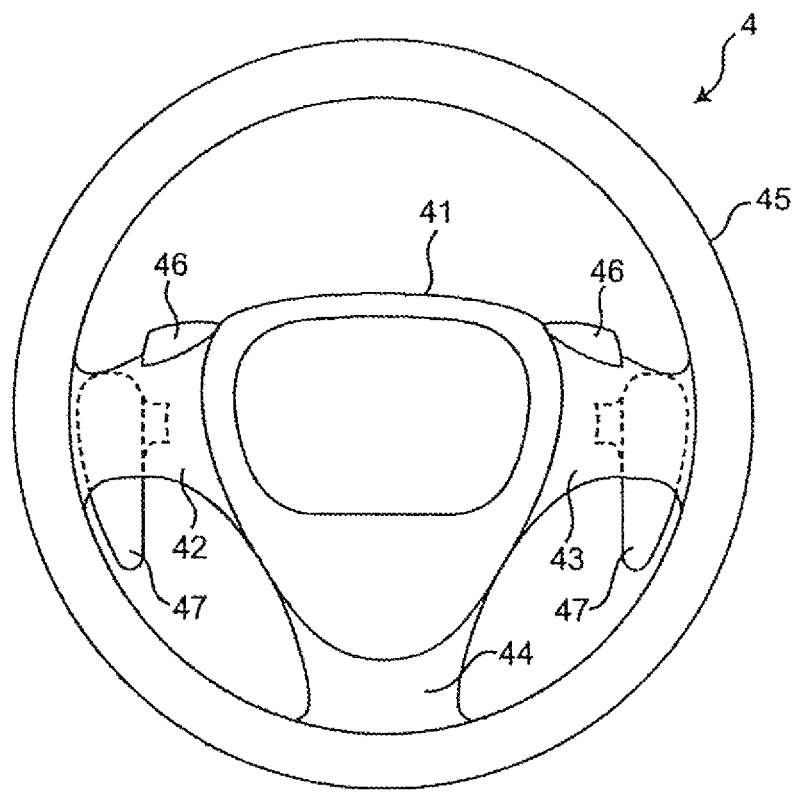
FIG. 3B is a front view illustrating the arrangement of the steering down switch and steering up switch.

As shown in FIG. 3A and FIG. 3B, the steering wheel 4 is constituted by a central paddle section 41, three spokes 42, 43, 44 extending in a T-like configuration from the paddle section 41, and a wheel section 45 supported by the spokes. A pair of left and right downshift switches (referred to hereinbelow as "steering down switches") 46 is provided in the upper section of the left and right spokes 42, 43, that is, close to the locations where the thumbs of the driver's left and right hands holding the wheel section 45 are positioned. A pair of left and right upshift switches (referred to hereinbelow as "steering up switches") 47 is provided at the left and right side sections of the paddle section 41 positioned at the rear side of the spokes 42, 43, that is, close to the locations where the fingers other than the thumbs of the driver's left and right hands holding the wheel section 45 are positioned.

The steering down switches 46 and the steering up switches 47 have the following two functions. The first function is to downshift or upshift the shift stage, instead of the shift lever down switch 34 and shift lever up shift 35, when the shift lever 3 is operated to the M range position and the manual mode is selected. The second function is to switch the shift mode from the automatic shift mode to the direct mode and downshift or upshift the shift stage by performing ON operation of either the steering down switches 46 or the steering up switches 47 when the shift lever 3 is operated in the D range position and the automatic shift mode is selected.

In either case, where either (or both) of the pair of steering down switches 46 is operated by pushing down in the direction shown by arrow A' in FIG. 3A, the switch 46 is operated ON, and the shift stage of the automatic transmission 2 is downshifted by one stage. Where either (or both) of the pair of steering up switches 47 is pulled forward, as shown by an arrow B', the switch 47 is operated ON and the shift stage is upshifted by one stage. The steering down switch 46 and the steering up switch 47 correspond to examples of the "shift operation detection device" in accordance with the present invention.

Figure 4:
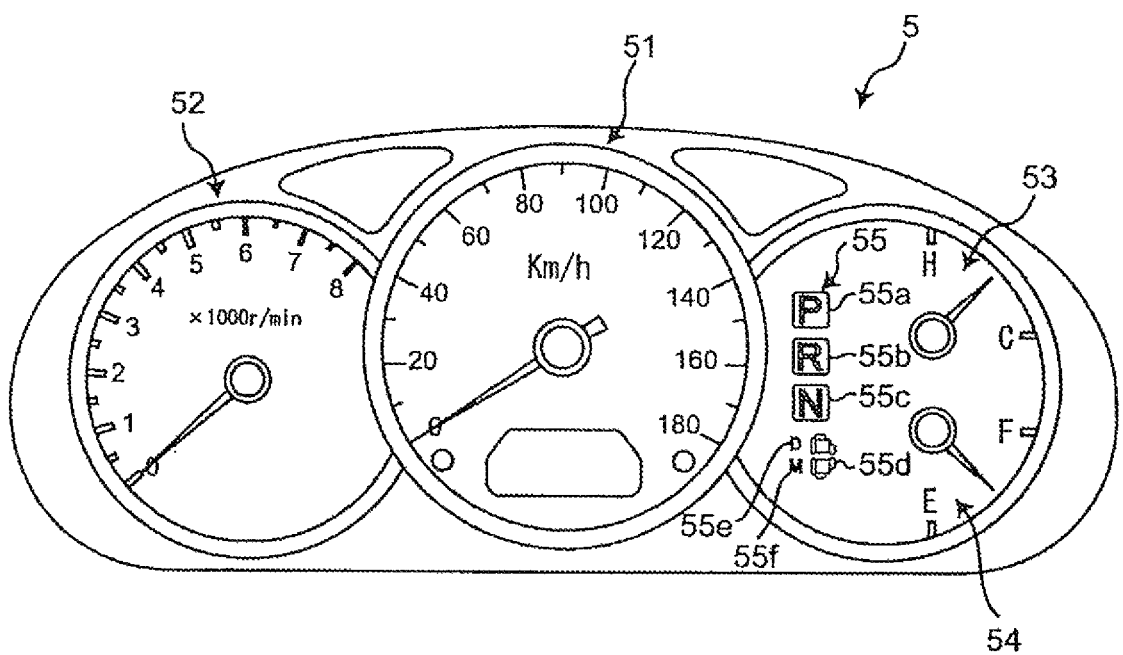
FIG. 4 illustrates the configuration of a meter unit.

As shown in FIG. 4, the meter unit 5 has a speedometer 51 disposed in the central section thereof, an engine revolution speed meter 52 disposed in the area to the left of the speedometer 51, a water temperature meter 53 disposed in the area to the right of the speedometer 51, a fuel meter 54, and an indicator 55. The indicator 55 indicates the state of the automatic transmission 2 and corresponds to an example of the "display device" in accordance with the present invention.

The indicator 55 has a P range display 55a, an R range display 55b, an N range display 55c, and a D range display 55d indicating the range selected by the operation of the shift lever 3. Further, a direct mode display 55e showing the letter "D" and a manual mode display 55f showing the letter "M" are disposed at the adjacent positions of the D range display 55d. Among those displays, the D range display 55d is constituted by a segment-type display.

The display forms of the D range display 55d, direct mode display 55e, and manual mode display 55f are explained below.

Figure 5A:
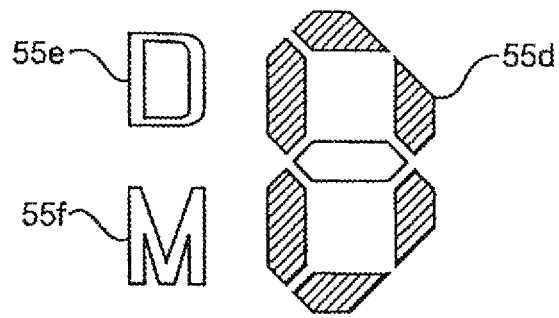
FIG. 5A illustrates the light-up pattern in the automatic shift mode of the automatic transmission indicator in the meter unit.

First, in the automatic shift mode in which the shift lever 3 is at the D range position, as shown in FIG. 5A, the direct mode display 55e and the manual mode display 55f are switched off and the D range display 55d displays the letter "D".

Figure 5B:
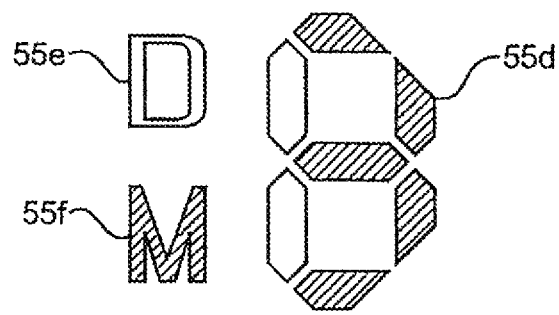
FIG. 5B indicates the light-up pattern in the manual mode of the automatic transmission indicator.

In the manual mode in which the shift lever 3 is at the M range position, as shown in FIG. 5B, the direct mode display 55e is switched off, the manual mode display 55f is switched on and the D range display 55d displays the number indicating the shift stage at this time ("3" in the example shown in the figure).

Figure 5C:
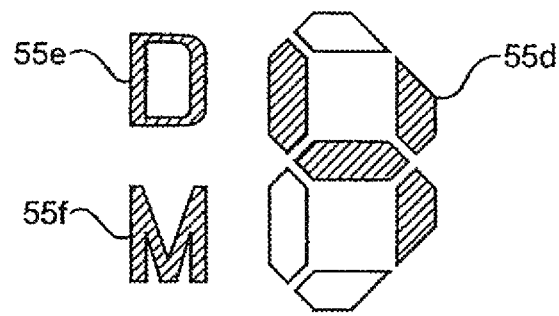
FIG. 5C indicates the light-up pattern in the direct mode of the automatic transmission indicator.

In the direct mode in which either the steering down switches 46 or the steering up switches 47 are set by ON operation in a state in which the shift lever 3 is operated to the D range position, as shown in FIG. 5C, both the direct mode display 55e and the manual mode display 55f are switched on and the D range display 55d displays the number indicating the shift stage at this time ("4" in the example shown in the figure).

A controller 100 that controls the automatic transmission 2 and the indicator 55 will be explained below.

As shown in FIG. 6, the controller 100 receives an input signal from an engine revolution speed sensor 101 that detects the revolution speed of the engine 1, an input signal from a turbine revolution speed sensor 102 that detects the turbine revolution speed of the torque converter 10, an input signal from a vehicle speed sensor 103 that detects the vehicle speed, an input signal from an accelerator opening sensor 104 that detects the depression amount of the accelerator pedal 6 (accelerator opening degree) as an engine load, and an input signal from a shift position sensor 105 that detects the operation position of the shift lever 3. The turbine revolution speed sensor 102 corresponds to an example of the "input revolution speed correlation value detection device" in accordance with the present invention.

Further, the controller 100 receives input signals from the shift lever down switch 34 and the shift lever up switch 35 for performing the control in the manual mode and receives input signals from the steering down switch 46 and the steering up switch 47 for performing the control in the manual mode and direct mode.

The controller 100 is also provided with a storage unit 110 that stores various types of information to be used for performing shift control of the automatic transmission 2 and the display control of the indicator 55 in the meter unit 5.

The controller 100 sets a shift stage on the basis of the signals from the sensors and switches and the information stored in the storage unit 110, outputs a shift control signal to the automatic transmission 2 to realize the shift stage, and outputs a display control signal for controlling the display state of the displays 55a to 55f in the indicator 55.

When a manual shift mode selected from the manual mode and direct mode is executed, the controller 100 essentially executes the shift control based on the manual operation.

Figure 7:
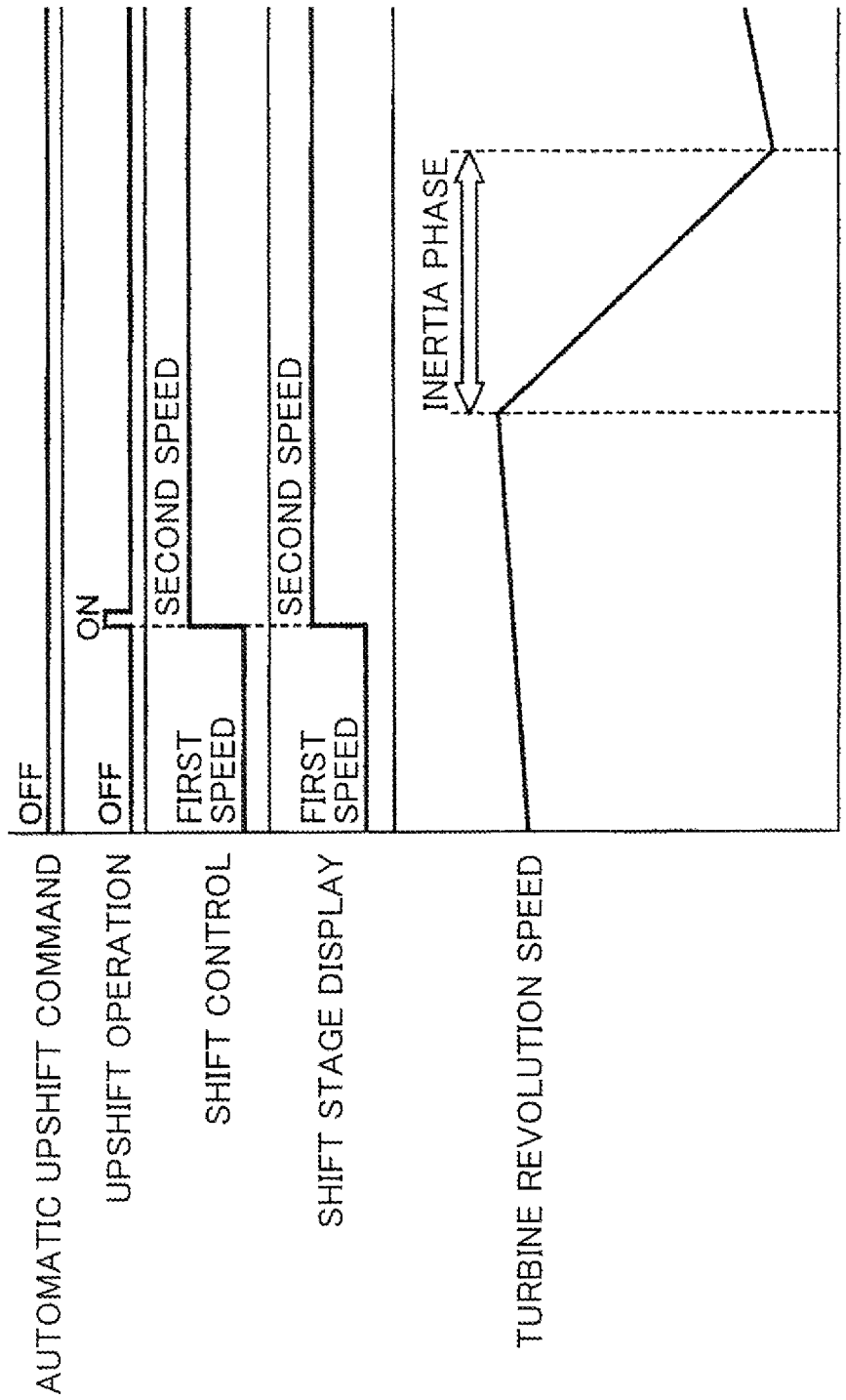
FIG. 7 is a time chart illustrating an example of operations in the case in which an upshift operation is performed in the manual mode.

For example, where an upshift operation from the first speed to the second speed is performed by the shift lever up switch 35 or the steering up switch 47 while the manual shift mode is executed as shown in FIG. 7, the controller 100 outputs an upshift control signal (referred to hereinbelow as "manual upshift command") for upshifting from the first speed to the second switch, which is based on the upshift operation, to the automatic transmission 2 at the timing at which the upshift operation has been performed. At the same time, the controller 100 outputs a display control signal for switching the shift stage display to the indicator 55 and switches the shift stage display of the D range display 55d of the indicator 55 from "1" to "2" (see FIGS. 5B and 5C).

Likewise, when the downshift operation is performed, the controller 100 outputs a downshift control signal (referred to hereinbelow as "manual downshift command"), which is based on the downshift operation, to the automatic transmission 2 at the timing at which the downshift operation has been performed and, at the same time, outputs a display control signal for switching the shift stage display to the indicator 55.

Where the shift control is executed, a hydraulic circuit corresponding to the shift is controlled in the automatic transmission 2. More specifically, when the shift control is started, a predetermined hydraulic control valve is actuated and oil pressure is thus controlled, thereby driving the corresponding friction element to engagement or disengagement. In the interval of time from after the drive of the friction elements has been started till it is completed, that is, during the shift operation, the revolution speed of the input shaft (input revolution speed) of the automatic transmission 2 is decreased in the case of upshifting and increased in the case of downshifting.

The period of time (referred to hereinbelow as "inertia phase"), in which the input revolution speed thus changes following the shift operation, is started at a timing delayed with respect to the shift control start time. By feeling the change in the input revolution speed in the inertia phase, the driver feels the shift. Since the input shaft of the automatic transmission 2 rotates together with the turbine of the torque converter 10, the inertia phase can be detected by detecting the revolution speed of the turbine as the input revolution speed.

Thus, in the manual shift mode, the controller 100 usually performs the shift control based on the manual operation, but in order to protect the engine 1, when a predetermined condition is fulfilled, for example, when the engine revolution speed exceeds an upper limit value or drops below a lower limit value, the controller outputs to the automatic transmission 2 a control signal causing automatic upshifting (referred to hereinbelow as "automatic upshift command") or a control signal causing automatic downshifting (referred to hereinbelow as "automatic downshift command").

The control by which upshifting is thus automatically performed while the manual shift mode is executed is called "automatic upshift control", and the control by which downshifting is automatically performed while the manual shift mode is executed is called "automatic downshift control". The automatic upshift control and automatic downshift control are together referred to as "automatic shift control".

The first to third control examples will be explained below as specific examples of control performed by the controller 100 in the case where the automatic shift control is executed as the manual shift mode is executed.

First Control Example

The first control example is explained below by using the flowcharts shown in FIG. 8 and FIG. 9.

The first control example is a control example relating to the case in which the automatic upshift control is executed while the manual shift mode is executed.

Figure 8:
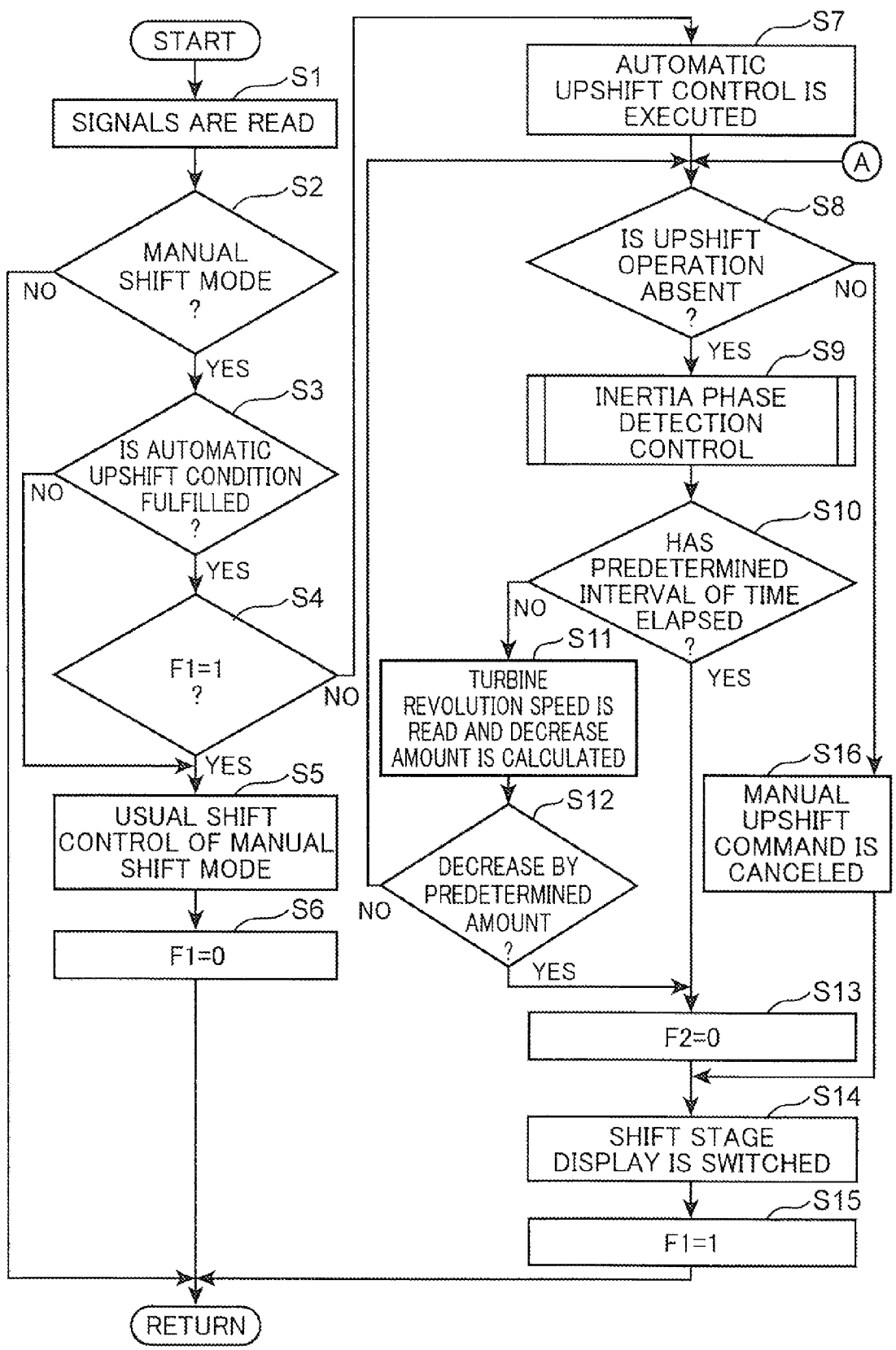
FIG. 8 is a flowchart illustrating the operation in the first control example of shift control.

As shown in FIG. 8, in the first control example, in step S1, the signals from the abovementioned sensors 101 to 105 and switches 34, 35, 46, 47 are read. Then, in step S2, it is determined whether or not any manual switch mode, of the manual mode and direct mode, is executed, and it is only when the manual shift mode is executed, the processing advances to step S3 and the below-described processing is executed.

In step S3, it is determined whether or not the condition for executing the automatic upshift control while the manual shift mode is executed has been fulfilled. The condition for executing the automatic upshift control is not particularly limited and can include, for example, the case in which the engine revolution speed exceeds a predetermined upper limit value.

Where the condition for executing the automatic upshift control is determined in step S3 to be fulfilled, the determination of a flag F1 is performed in step S4. The flag F1 is set to "1" when the automatic upshift control is ended and to "0" where the automatic upshift control is not ended. Where the flag F1 is determined in step S4 to be "0", the automatic upshift control is executed in step S7.

Meanwhile, where the condition for executing the automatic upshift control is determined in step S3 not to be fulfilled and the flag F1 is set to "1" as a result of the determination performed in step S4, the usual shift control in the manual shift mode, that is, the shift control based on the manual operation performed by the driver is executed in step S5, and the flag F1 is reset to "0" in step S6.

Where the automatic upshift control of step S7 is executed, in the subsequent step S8, it is determined whether or not the upshift operation has been performed by the driver while the automatic upshift control is executed, and where the upshift operation has been performed, the output of the manual upshift command is canceled (step S16) and a display control signal for switching to the shift stage display after the upshift is outputted to the indicator 55 at a timing at which the upshift operation is performed (step S14). Such switching of the shift stage display in step S14 ends the automatic upshift control, and the flag F1 is set to "1" in the subsequent step S15.

Figure 10:
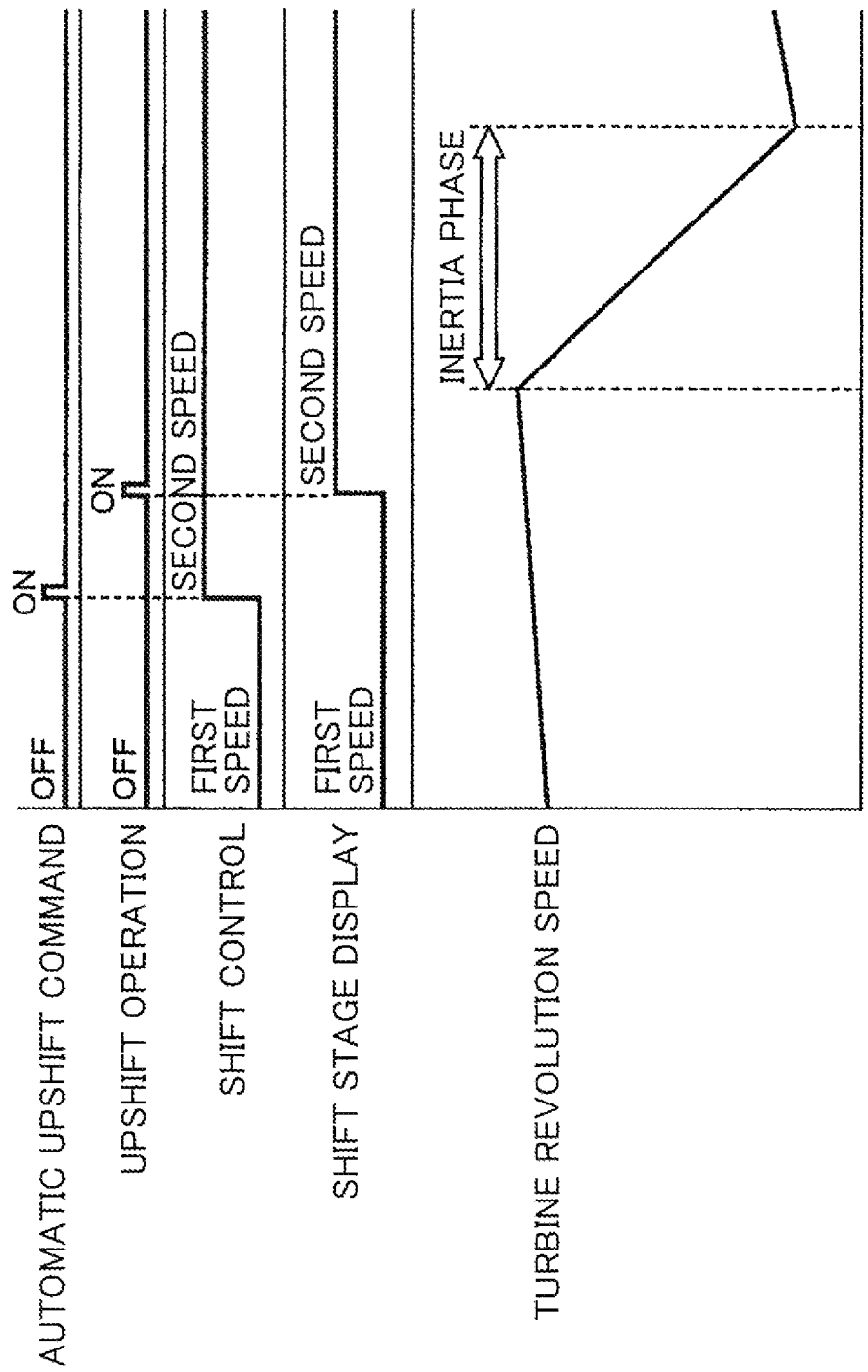
FIG. 10 is a time chart illustrating an example of operations in the case in which an upshift operation is performed while the automatic upshift control is executed in the manual mode in the same control example.

By so canceling the manual upshift command in step S16, it is possible to prevent the execution of two-stage upshift from the first speed to the third speed contrary to the driver's intention, for example, in the case where the driver performs the upshift operation that overlaps the automatic upshift control from the first speed to the second speed, without being aware of such automatic upshift control, as shown in FIG. 10.

Further, in this case, the timing at which the shift stage display of the D range display 55d (see FIGS. 5B and 5C) of the indicator 55 is switched by step S14 from "1" to "2" is the timing of the upshift operation performed by the driver, rather than the timing of the automatic upshift control. Therefore, such switching of the shift stage display can prevent the driver from having an uncomfortable feeling.

Further, when a plurality of upshift operations is performed as the automatic upshift control is executed, the manual upshift command is canceled as described hereinabove with respect to the first upshift operation (step S16), but in this case, the return is performed after the flag F1 has been set to "1" in step S15, thereby enabling the execution of the upshift based on the manual operation in step S5 with respect to the second and subsequent upshift operations. As a result, the number of executed upshifts is equal to the number of manual operations, and the display at the D range display 55d of the indicator 55 is switched to the shift stage display after the upshift at the timing of each manual operation.

Figure 11:
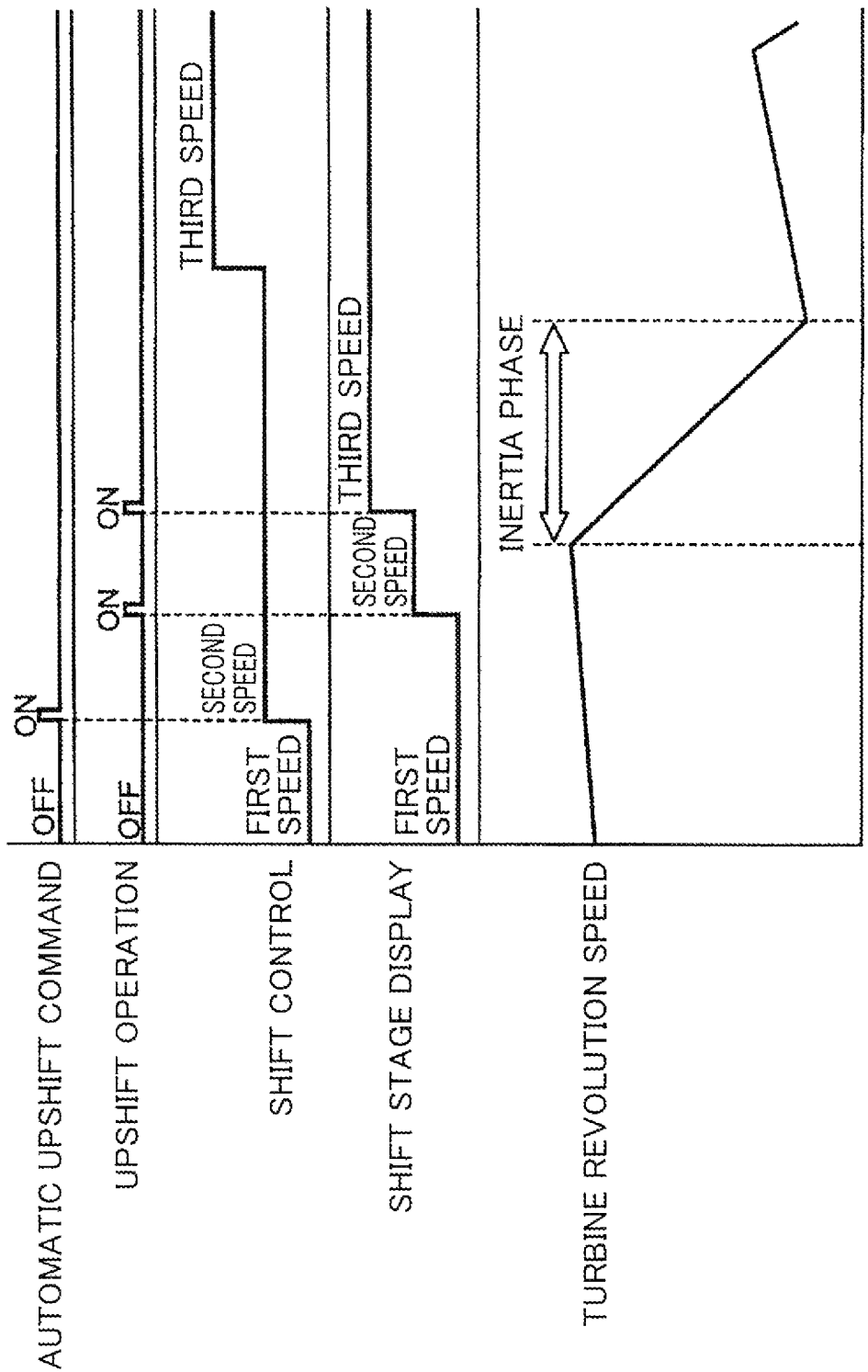
FIG. 11 is a time chart illustrating an example of operations in the case in which two upshift operations are performed while the automatic upshift control is executed in the manual mode in the same control example.

Therefore, when the driver performs twice the shift operation with the intention of two-stage upshifting from the first speed to the third speed, for example, as shown in FIG. 11, the two-stage upshift corresponding to this intention can be realized, and because the shift stage display is switched at the timing of each upshift operation, the driver is prevented from being given an uncomfortable feeling.

Meanwhile, where it is determined in step S8 that the upshift operation is not performed by the driver as the automatic upshift control is executed, the inertia phase detection control is executed in step S9.

The inertia phase detection control is explained below with reference to the flowchart shown in FIG. 9.

In the inertia phase detection control, first, a flag F2 is determined in step S21. The flag F2 is set to "1" when the inertia phase has started and set to "0" when the inertia phase has not started. Where the flag F2 is determined in step S21 to be "0", the processing advances to step S22, and it is determined whether or not the inertia phase has been started. More specifically, in step S22, for example, in the case of upshifting, the inertia phase is determined to have started by detecting that the turbine revolution speed has changed from increasing to decreasing, whereas in the case of downshifting, the inertia phase is determined to have started by detecting that the turbine revolution speed has changed from decreasing to increasing.

When the inertia phase is determined in step S22 not to have started, the processing returns to step S8 in FIG. 8. Meanwhile, where the inertia phase is determined to have started, the processing advances to step S23 and the count of a timer is started. The time elapsed after the inertia phase has started, as counted by the timer, corresponds to an example of the "input revolution speed correlation value" in accordance with the present invention. This is because the turbine revolution speed varies substantially proportionally to the elapsed time since the inertia phase start time.

In the subsequent step S24, the turbine revolution speed (Ta) at the inertia phase start time is read, and the turbine revolution speed (Tz) at the shift operation end time, that is, at the inertia phase end time, is calculated on the basis of the turbine revolution speed (Ta) and the information on the shift stages before and after the upshifting. Further, in step S24, the variation amount (Vmax) of the turbine revolution speed within the period of time (entire period of the shift operation) from the inertia phase start time to the inertia phase end time is calculated. More specifically, since the upshifting is performed in this case, the decrease amount (Ta−Tz) of the turbine revolution speed in the entire period of the shift operation is calculated as the Vmax. In step S24, the turbine revolution speed (Ta) at the inertia phase start time that has been read out and the calculated decrease amount (Vmax) of the turbine revolution speed in the entire period of the shift operation are stored in the storage unit 110, and the flag F2 is set to "1" in step S25.

Figure 9:
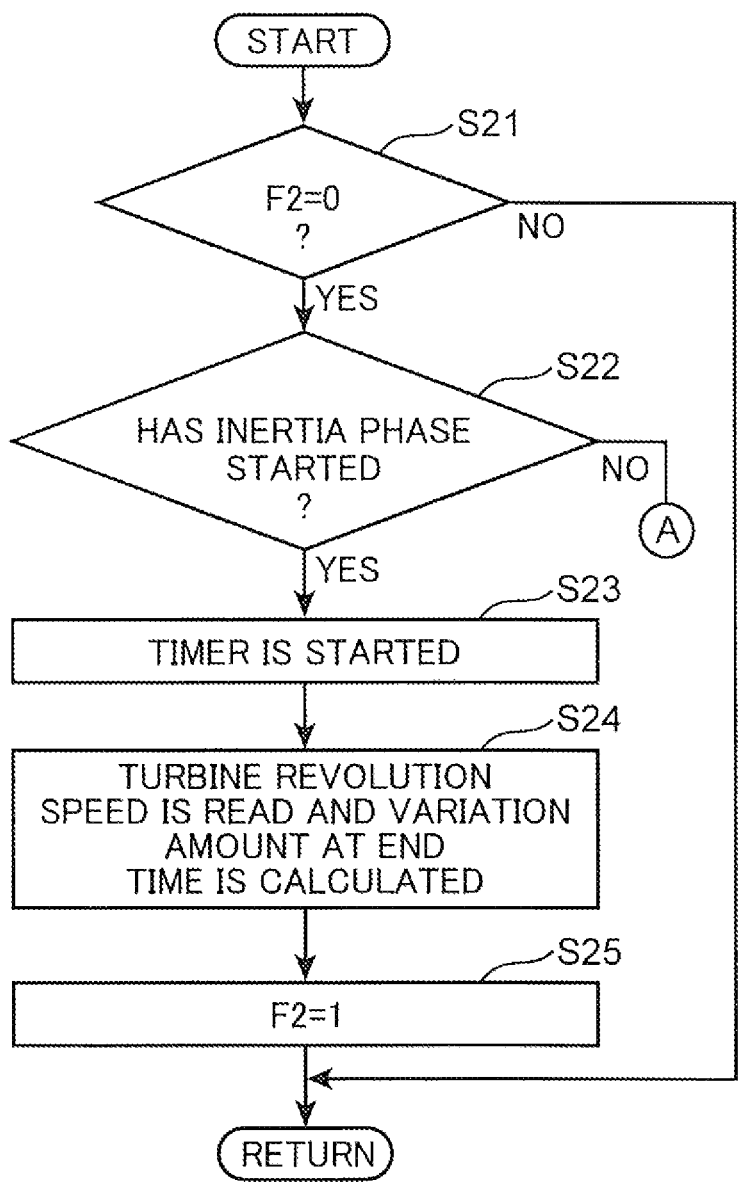
FIG. 9 is a flowchart illustrating the operations in the inertia phase detection control of the same control example.

Returning to FIG. 8, after the inertia phase detection control of step S9 has been executed, in the subsequent step S10, it is determined whether or not the count of the timer started in step S23 in FIG. 9, that is, the elapsed time since the inertia phase start time, has reached a predetermined value (for example, 500 msec) that has been set in advance as a value at the time the driver recognizes the shifting.

Where the elapsed time is determined in step S10 to have reached the predetermined value, the flag F2 is reset to "0" (step S13), a display control signal for switching to the shift stage display after the upshifting is outputted to the indicator 55 (step S14), and the flag F1 is set to "1" (step S15).

Meanwhile, where it is determined in step S10 that the elapsed time has not reached the predetermined value, the determination of step S12 is performed via step S11.

In step S11, the turbine revolution speed (T1) is read and the decrease amount (V1=Ta−T1) of the turbine revolution speed from the inertia phase start time is calculated on the basis of the turbine revolution speed (T1) and the turbine revolution speed (Ta) at the inertia phase start time stored in step S24 in FIG. 9. The decrease amount (V1) of the turbine revolution speed after the inertia phase start that is calculated herein, that is, the variation amount of the revolution speed (input revolution speed) of the input shape of the automatic transmission 2, corresponds to an example of the "input revolution speed correlation value" in accordance with the present invention. However, as has already been indicated hereinabove, in the present embodiment, the elapsed time after the inertia phase start is also examined as the "input revolution speed correlation value". Thus, in the present embodiment, both the "variation amount of the input revolution speed" and the "elapsed time" after the inertia phase start are examined as the "input revolution speed correlation value".

In the subsequent step S12, it is determined whether or not the turbine revolution speed has decreased by a predetermined amount after the inertia phase start. More specifically, it is determined whether or not the ratio (V1/Vmax) of the decrease amount (V1) of the turbine revolution speed in the course of the shift operation calculated in step S11 to the decrease amount (Vmax) of the turbine revolution speed over the entire period of time of the shift operation calculated in step S24 shown in FIG. 9 has reached a predetermined value (for example, 50%) that has been set in advance as a value at the time the driver recognizes the shifting.

Where it is determined in step S12 that the ratio has not reached the predetermined value, the processing returns to step S8. Meanwhile, where it is determined that the ratio has reached the predetermined value, the flag F2 is reset to "0" (step S13), a display control signal for switching to the shift stage display after the upshifting is outputted to the indicator 55 (step S14), and the flag F1 is set to "1" (step S15).

Thus, according to the first control example, where no shift operation is performed by the driver while the automatic upshift control is executed after the automatic upshift control has been started, the shift stage display is switched when one of the following conditions is fulfilled: the elapsed time since the point of time at which the inertia phase has started reaches the predetermined value and the ratio (V1/Vmax) of the decrease amount of the turbine revolution speed after the aforementioned point of time reaches the predetermined value.

Figure 12:
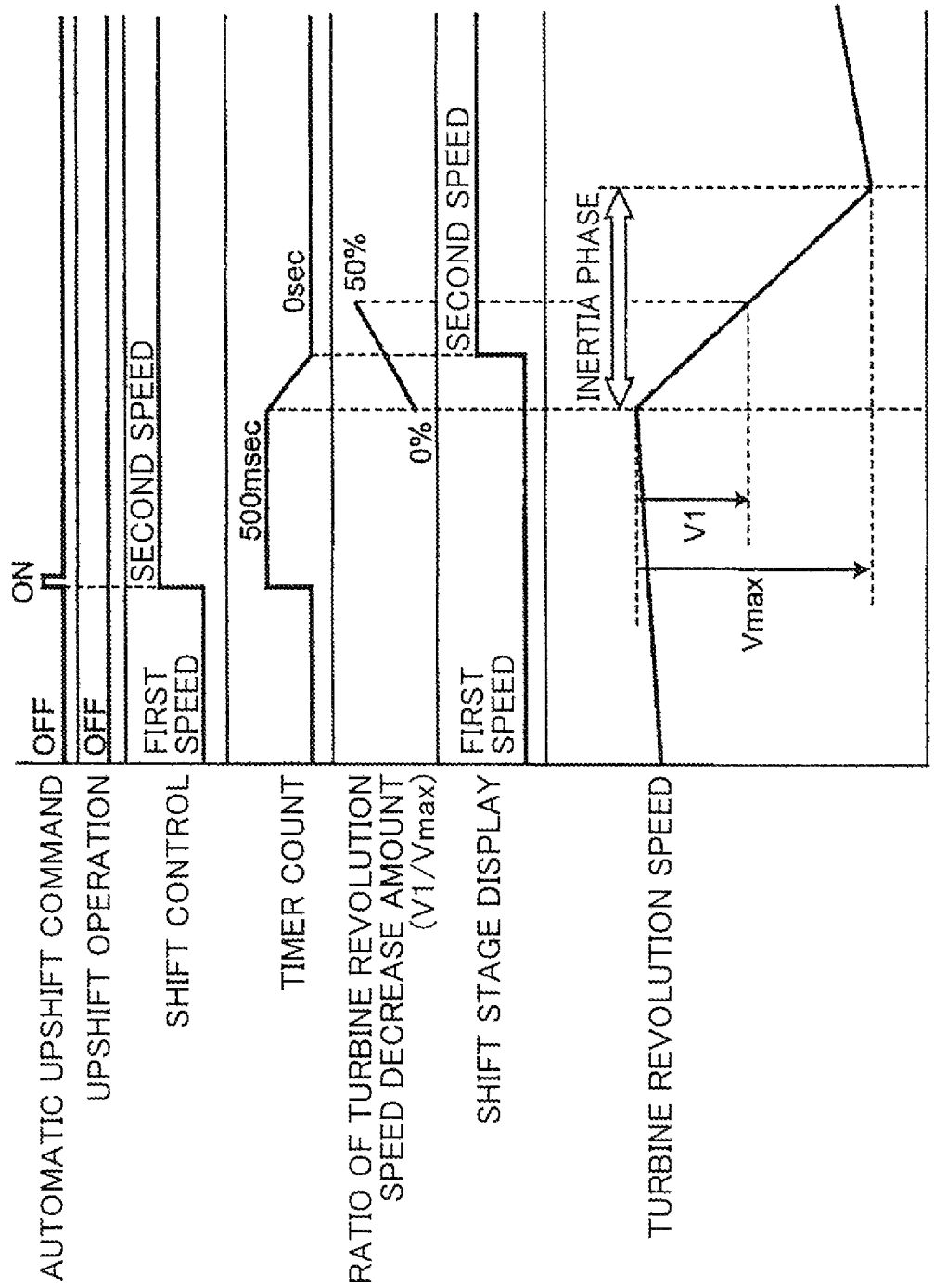
FIG. 12 is a time chart illustrating an example of operations in the case in which no shift operation is performed while the automatic upshift control is executed in the manual mode in the same control example.

FIG. 12 is a time chart illustrating an example of a display switch operation such as mentioned hereinabove, this example relating to the case in which the automatic upshift control is executed from the first speed to the second speed. In the example shown in FIG. 12, the predetermined time (500 msec) elapses before the ratio (V1/Vmax) of the decrease amount of the turbine revolution speed after the inertia phase start reaches the predetermined value (50%). In this case, the shift stage display of the indicator 55 is switched from "1" to "2" at a timing at which the predetermined time (500 msec) elapses.

Figure 13:
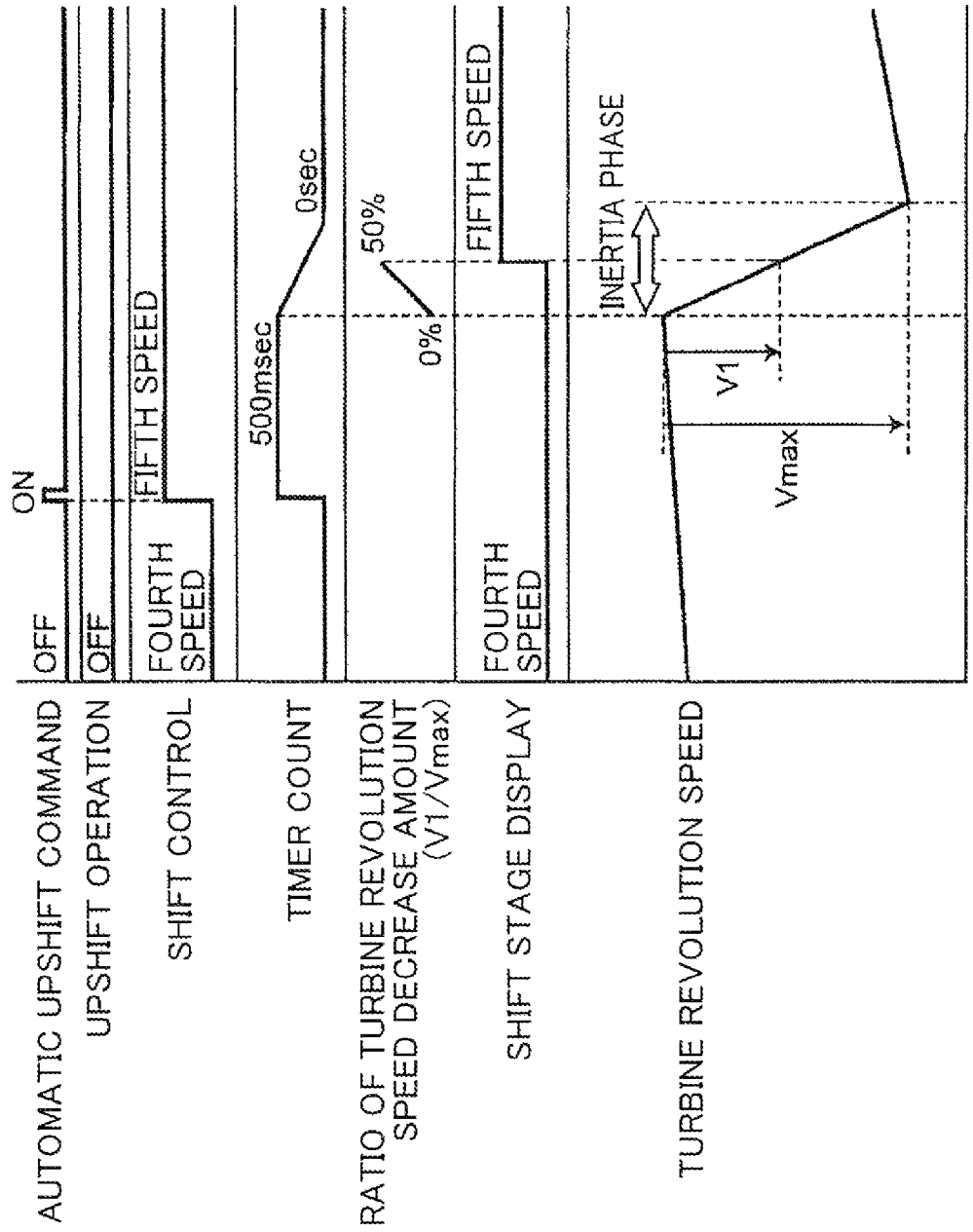
FIG. 13 is a time chart illustrating a separate operation example in the same case.

Meanwhile, FIG. 13 illustrates the case in which the automatic upshift control is executed from the fourth speed to the fifth speed. In the example shown in FIG. 13, the ratio (V1/Vmax) of the decrease amount of the turbine revolution speed reaches the predetermined value (50%) after the inertia phase start and before the predetermined time (500 msec) elapses. In this case, the shift stage display of the indicator 55 is switched from "4" to "5" at a timing at which the ratio of the decrease amount reaches the predetermined value (50%).

The advance rate of the shift operation generally increases and the inertia phase tends to become shorter when the shifting is performed in a high-shift region, but in the first control example, the shift stage display is switched at the fulfillment timing of the condition that is fulfilled earlier from among the two abovementioned conditions. Therefore the shift stage display can be switched at the advantageous timing at which the driver can recognize the upshift, without any delay, in any shift region. As a result, where the driver does not perform a shift operation while the automatic upshift control is executed, the driver can be effectively prevented from having an uncomfortable feeling by the switch of the shift stage display.

Figure 14:
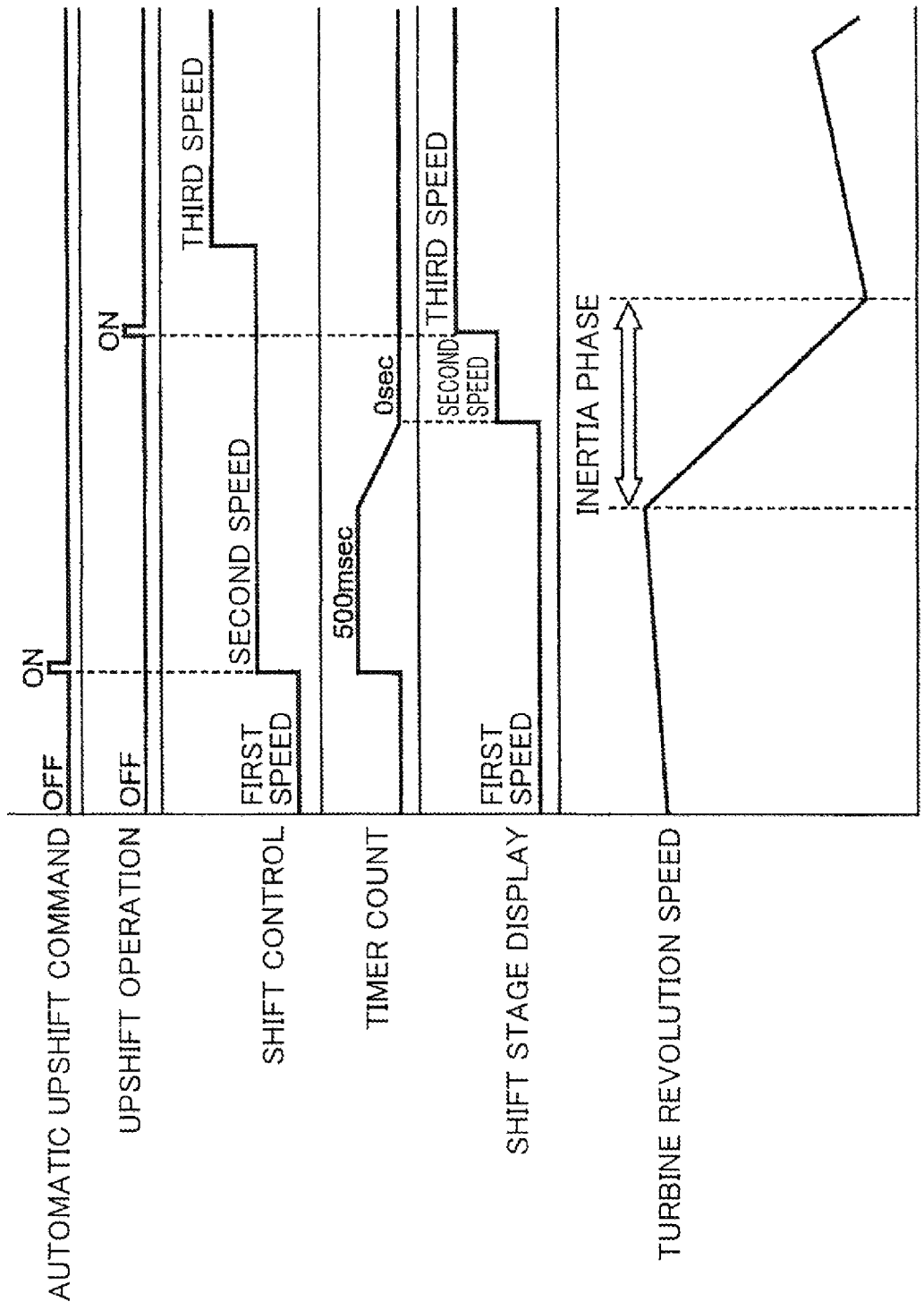
FIG. 14 is a time chart illustrating an example of operations in the case in which an upshift operation is performed after the automatic upshift control has been executed and the shift stage display has been switched in the manual mode in the same control example.

Further, the upshift operation is sometimes performed by the driver immediately after the automatic upshift control has ended, that is, immediately after the shift stage display has been switched, for example, as shown in FIG. 14. In such a case, the upshift based on the upshift operation is executed when a predetermined standby time elapses after the shift operation performed by the automatic upshift control has been completed. Meanwhile, the switching of the display to the shift stage after the upshift based on the manual operation is executed at a timing at which the manual operation is performed. As a result, the driver can be prevented from being given an uncomfortable feeling.

Second Control Example

Figure 15:
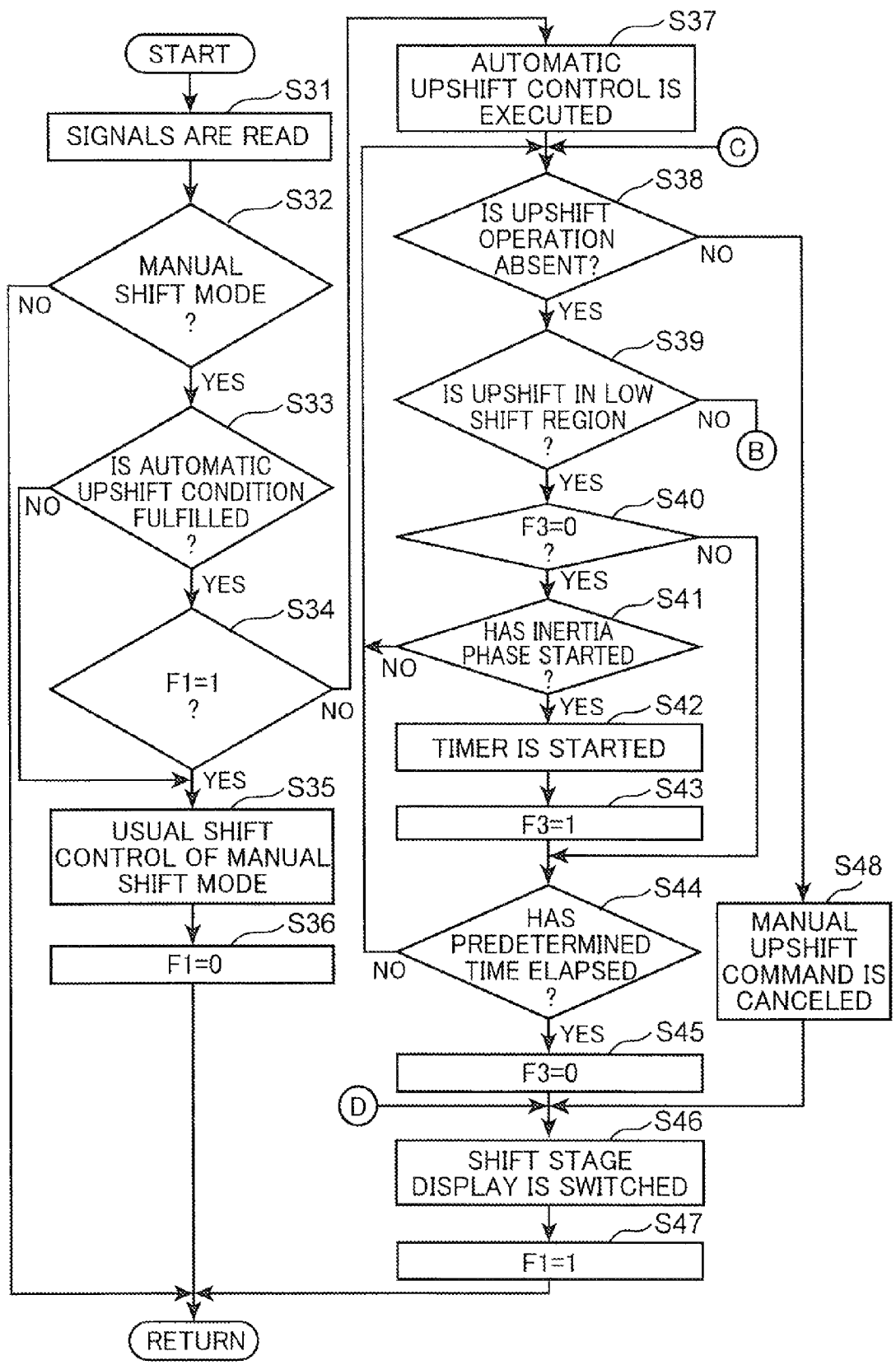
FIG. 15 is a flowchart illustrating the operations performed in the second control example of shift control.

The second control example is explained below by using the flowcharts shown in FIGS. 15 and 16.

Similarly to the first control example, the second control example relates to the case in which the automatic upshift control is executed while the manual shift mode is executed, but the control method in the case in which no shift operation is performed while the automatic upshift control is executed is different from that of the first control example.

More specifically, steps S31 to S38 of the second control example are same as steps S1 to S8 of the first control example, and the steps S46 to S48 of the second control example are same as those of steps S14 to S16 of the first control example. Thus, in the second control example, each processing performed before the automatic upshift control is executed (steps S31 to S37), the processing of determining whether or not the upshift operation has been performed while the automatic upshift control is executed (step S38), and each processing executed in the case in which the upshift operation has been performed while the automatic upshift control is executed (steps S46 to S48) are executed in the same manner as in the first control example, and therefore the explanation thereof is herein omitted.

The control method performed by the controller 100 in the case in which no shift operation is performed while the automatic upshift control is executed, as determined in step S38, in the second control example is explained below.

First, in step S39, it is determined whether or not the upshifting by the automatic upshift control has been performed in a low-shift region. More specifically, for example, the upshifting from the first speed to the second speed and the upshifting from the second speed to the third speed are preset to belong to the first shift region with comparatively low shift stages, and the upshifting from the third speed to the fourth speed, from the fourth speed to the fifth speed, and from the fifth speed to the sixth speed are preset to belong to the second shift region with a higher shift stage than the first shift region, and the shift region to which the upshifting performed in step S37 belongs is determined.

Where it is determined in step S39 that the upshifting belongs to the first shift region on a low speed side, the determination of step S44 is performed via steps S40 to S43.

More specifically, the determination of a flag F3 is performed in step S40. The flag F3 is set to "1" where the inertia phase is started during the execution of the automatic upshift control belonging to the first shift region and set to "0" where the inertia phase has not yet been started. Where it is determined step S40 that the flag F3 is "0", the processing advances to step S41, and where the flag F3 is "1", steps S41 to S43 are omitted and the processing advances to step S44.

In step S41, it is determined whether or not the inertia phase has been started. The specific determination method of step S41 is similar to that of step S22 (FIG. 9) of the first control example. Where it is determined in step S41 that the inertia phase has not been started, the processing returns to step S38, and where the inertia phase has been started, the timer count is started (step S42) and the flag F3 is set to "1" (step S43).

In step S44, it is determined whether or not the timer count started in step S42, that is, the elapsed time since the inertia phase start time, has reached the predetermined time preset as a value at the time the driver recognizes the shifting.

The predetermined time of step S44 is preferably set individually for each shift stage. Further, in this case, the predetermined time of step S44 is preferably set to be shorter for a higher shift stage prior to the upshifting, in order to respond to the advance rate of the shift operation which is higher for shifting in the high shift region. For example, 500 msec is set for upshifting from the first speed to the second speed and 400 msec is set for upshifting from the second speed to the third speed as specific values of the predetermined time.

Where it is determined in step S44 that the elapsed time has reached the predetermined time, the flag F3 is reset to "0" (step S45), a display control signal for switching to the shift stage display after the upshifting is outputted to the indicator 55 (step S46), and the flag F1 is set to "1" (step S47).

Figure 16:
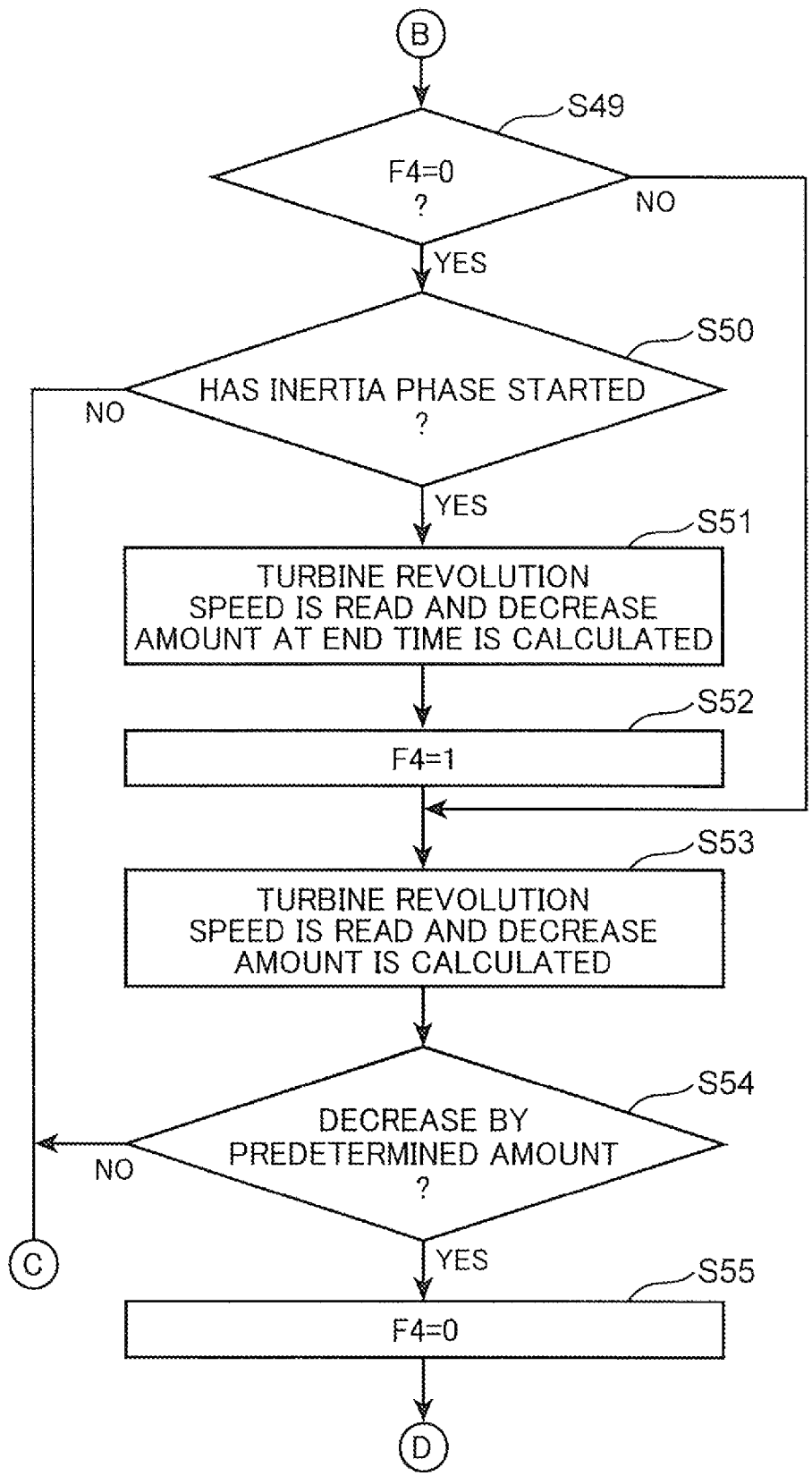
FIG. 16 is a flowchart illustrating the remaining operations in the same control example.

Meanwhile, where it is determined in step S39 that the upshifting belongs to the second shift region on a high speed side, the determination of step S54 is performed via steps S49 to S53 in FIG. 16.

More specifically, first, the determination of a flag F4 is performed in step S49, as shown in FIG. 16. The flag F4 is set to "1" where the inertia phase is started during the execution of the automatic upshift control belonging to the second shift region and set to "0" where the inertia phase has not yet been started. Where it is determined in step S49 that the flag F4 is "0", the processing advances to step S50, and where the flag F4 is "1", steps S50 to S52 are omitted and the processing advances to step S53.

In step S50, it is determined whether or not the inertia phase has been started. The specific determination method of step S50 is similar to that of step S41 (FIG. 15). Where it is determined in step S50 that the inertia phase has not been started, the processing returns to step S38 (FIG. 15), and where the inertia phase has been started, the processing advances to step S51.

In step S51, the processing similar to that of step S24 (FIG. 9) of the first control example is executed. Thus, the turbine revolution speed (Ta) at the inertia phase start time is read, and the turbine revolution speed (Tz) at the shift operation end time, that is, at the inertia phase end time, is calculated on the basis of the turbine revolution speed (Ta) and the information on the shift stages before and after the upshifting. Further, the decrease amount (Vmax=Ta−Tz) of the turbine revolution speed within the period of time (entire period of the shift operation) from the inertia phase start time to the inertia phase end time is calculated. In step S51, the turbine revolution speed (Ta) at the inertia phase start time that has been read out and the calculated decrease amount (Vmax) of the turbine revolution speed in the entire period of the shift operation are stored in the storage unit 110, and the flag F4 is set to "1" in step S52.

In step S53, the processing similar to that of step S11 (FIG. 8) of the first control example is executed. Thus, the turbine revolution speed (T1) is read and the decrease amount (V1=Ta−T1) of the turbine revolution speed from the inertia phase start time is calculated on the basis of the turbine revolution speed (T1) and the turbine revolution speed (Ta) at the inertia phase start time stored in step S51.

In the subsequent step S54, it is determined whether or not the turbine revolution speed has decreased by a predetermined amount after the inertia phase start. More specifically, it is determined whether or not the ratio (V1/Vmax) of the decrease amount (V1) of the turbine revolution speed in the course of the shift operation calculated in step S53 to the decrease amount (Vmax) of the turbine revolution speed over the entire period of time of the shift operation calculated in step S51 has reached a predetermined value that has been set in advance as a value at the time the driver recognizes the shifting.

The predetermined value of step S54 is preferably set individually for each shift stage. Further, in this case, the predetermined value of step S54 is preferably set to be greater for a higher shift stage prior to the upshifting, in order to respond to the advance rate of the shift operation, that is, the variation rate of the input revolution speed, which is higher for shifting in the high shift region. For example, 40% is set for upshifting from the third speed to the fourth speed, 45% is set for upshifting from the fourth speed to the fifth speed, and 50% is set for upshifting from the fifth speed to the sixth speed as specific values of the predetermined value.

Where it is determined in step S54 that the ratio has not reached the predetermined value, the processing returns to step S38, and when it is determined that the ratio has reached the predetermined value, the flag F4 is reset to "0" (step S55), a display control signal for switching to the shift stage display after the upshifting is outputted to the indicator 55 (step S46), and the flag F1 is set to "1" (step S47).

Thus, according to the second control example, in the case in which the upshift belongs to the first shift region on the low speed side, where no shift operation is performed by the driver while the automatic upshift control is executed after the automatic upshift control has been started, the shift stage display is switched at a timing based on the elapsed time since the point of time at which the inertia phase has started, rather than the variation amount of the input revolution speed (turbine revolution speed) since the point of time at which the inertia phase has started, because the input revolution speed changes gradually following the shift operation. As a result, the driver can be effectively prevented from being given an uncomfortable feeling.

Conversely, in the case in which the upshifting performed by the automatic upshift control belongs to the second shift region on a high speed side, the shift stage display is switched at the timing based on the ratio (V1/Vmax) of the decrease amount of the turbine revolution speed since the point of time at which the inertia phase has started, rather than on the elapsed time since the inertia phase has started, because the input revolution speed is rapidly changed by the shift operation. In this case, the driver also can be effectively prevented from being given an uncomfortable feeling.

Third Control Example

The third control example is explained below by using the flowchart shown in FIG. 17.

The third control example relates to the case in which the automatic downshift control is performed while the manual shift mode is executed.

Figure 17:
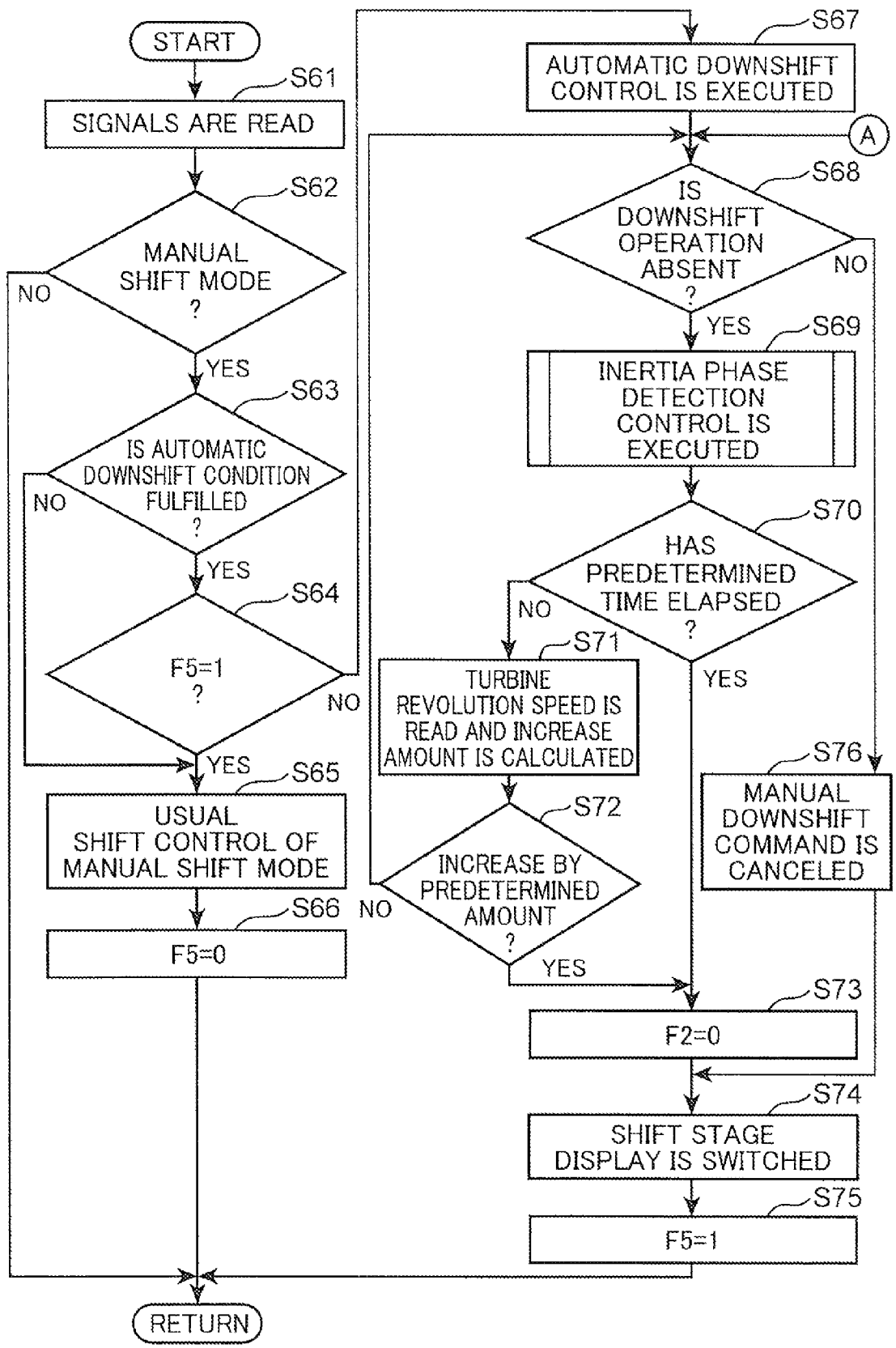
FIG. 17 is a flowchart illustrating the operations performed in the third control example of shift control.

As shown in FIG. 17, in the third control example, in step S61, the signals from the abovementioned sensors 101 to 105 and switches 34, 35, 46, 47 are read. Then, in step S62, it is determined whether or not any manual switch mode, of the manual mode and direct mode, is executed, and it is only when the manual shift mode is executed, the processing advances to step S63 and the below-described processing is executed.

In step S63, it is determined whether or not the condition for executing the automatic downshift control while the manual shift mode is executed has been fulfilled. The condition for executing the automatic downshift control is not particularly limited and can include, for example, the case in which the engine revolution speed is below a predetermined lower limit value.

Where the condition for executing the automatic downshift control is determined in step S63 to be fulfilled, the determination of a flag F5 is performed in step S64. The flag F5 is set to "1" when the automatic downshift control is ended and to "0" when the automatic downshift control is not ended. Where the flag F5 is determined in step S64 to be "0", the automatic downshift control is executed in step S67.

Meanwhile, where the condition for executing the automatic downshift control is determined in step S63 not to be fulfilled and the flag F5 is set to "1" as a result of the determination performed in step S64, the usual shift control in the manual shift mode, that is, the shift control based on the manual operation performed by the driver, is executed in step S65, and the flag F5 is reset to "0" in step S66.

Where the automatic downshift control of step S67 is executed, in the subsequent step S68, it is determined whether or not the downshift operation has been performed by the driver while the automatic downshift control is executed, and where the downshift operation has been performed, the output of the manual downshift command is canceled (step S76) and a display control signal for switching to the shift stage display after the downshift is outputted to the indicator 55 at the timing at which the downshift operation has been performed (step S74). Such switching of the shift stage display in step S74 ends the automatic downshift control, and the flag F5 is set to "1" in the subsequent step S75.

By so canceling the manual downshift command in step S76, it is possible to prevent the execution of two-stage downshift contrary to the driver's intention in the case where the driver performs the downshift operation that overlaps the automatic downshift control, without being aware of such automatic downshift control.

Further, in this case, the timing at which the shift stage display of the D range display 55d (see FIGS. 5B and 5C) of the indicator 55 is switched by step S74 is the timing of the downshift operation performed by the driver, rather than the timing of the automatic downshift control. Therefore, such switching of the shift stage display can prevent the driver from having an uncomfortable feeling.

Further, when a plurality of downshift operations is performed while the automatic downshift control is executed, the manual downshift command is canceled as described hereinabove with respect to the first downshift operation (step S76), but in this case, a return is performed after the flag F5 has been set to "1" in step S75, thereby enabling the execution of the downshift based on the manual operation in step S65 with respect to the second and subsequent downshift operations. As a result, the number of executed downshifts is equal to the number of manual operations, and the display at the D range display 55d of the indicator 55 is switched to the shift stage display after the downshift at the timing of each manual operation.

Therefore, when the driver performs twice the shift operation with the intention of multiple-stage downshifting, the multiple-stage downshifting corresponding to this intention can be realized, and because the shift stage display is switched at the timing of each downshift operation, the driver is prevented from being given an uncomfortable feeling.

Meanwhile, where it is determined in step S68 that the downshift operation is not performed by the driver while the automatic downshift control is executed, the inertia phase detection control is executed in step S69. The inertia phase detection operation of step S69 is executed in the same manner as in the first control example (see step S9 of FIG. 8 and FIG. 9), except that the increase amount, rather than the decrease amount, of the revolution speed is calculated and stored as the variation amount (Vmax) of the turbine revolution speed. Therefore, the explanation of the phase detection operation is herein omitted.

In the subsequent step S70, it is determined whether or not the count of the timer started in the inertia phase detection control of step S69, that is, the elapsed time since the inertia phase start time, has reached a predetermined value (for example, 500 msec) that has been set in advance as a value at the time the driver recognizes the shifting.

Where the elapsed time is determined in step S70 to have reached the predetermined value, the flag F2 that has been set to "1" in the inertia phase detection control is reset to "0" (step S73), a display control signal for switching to the shift stage display after the downshifting is outputted to the indicator 55 (step S74), and the flag F5 is set to "1" (step S75).

Meanwhile, where it is determined in step S70 that the elapsed time has not reached the predetermined value, the determination of step S72 is performed via step S71.

In step S71, the turbine revolution speed (T1) is read and the increase amount (V1=T1−Ta) of the turbine revolution speed from the inertia phase start time is calculated on the basis of the turbine revolution speed (T1) and the turbine revolution speed (Ta) at the inertia phase start time stored in the inertia phase detection control.

In the subsequent step S72, it is determined whether or not the turbine revolution speed has increased by a predetermined amount after the inertia phase start. More specifically, it is determined whether or not the ratio (V1/Vmax) of the increase amount (V1) of the turbine revolution speed in the course of the shift operation calculated in step S71 to the increase amount (Vmax) of the turbine revolution speed over the entire period of time of the shift operation calculated in the inertia phase detection control has reached a predetermined value (for example, 50%) that has been set in advance as a value at the time the driver recognizes the shifting.

Where it is determined in step S72 that the ratio has not reached the predetermined value, the processing returns to step S68. Meanwhile, where it is determined that the ratio has reached the predetermined value, the flag F2 is reset to "0" (step S73), a display control signal for switching to the shift stage display after the downshifting is outputted to the indicator 55 (step S74), and the flag F1 is set to "1" (step S75).

Thus, according to the third control example, where no shift operation is performed by the driver while the automatic downshift control is executed after the automatic downshift control has been started, the shift stage display is switched at the fulfillment timing of the condition that is fulfilled earlier from among the two following conditions: the elapsed time since the point of time at which the inertia phase has started reaches the predetermined value and the ratio (V1/Vmax) of the increase amount of the turbine revolution speed after the aforementioned point of time reaches the predetermined value. Therefore the shift stage display can be switched at the advantageous timing at which the driver can recognize the downshift, without any delay, in all of the shift regions with different advance rates of the shift operation. As a result, where the driver does not perform a shift operation while the automatic upshift control is executed, the driver can be effectively prevented from being given an uncomfortable feeling by the switch of the shift stage display.

The present invention has been explained in the above-described embodiments, but the present invention is not limited to the embodiments.

For example, in the third control example, the configuration is explained in which where no shift operation is performed by the driver while the automatic downshift control is executed, the shift stage display is switched at the fulfillment timing of the condition that is fulfilled earlier from among the two following conditions: the elapsed time since the point of time at which the inertia phase has started reaches the predetermined value and the ratio (V1/Vmax) of the increase amount of the turbine revolution speed after the aforementioned point of time reaches the predetermined value. However, the shift stage display may be also switched in a manner similar to that of the second control example executed in the case of upshifting. Thus, where the downshifting performed in the automatic downshift control belongs to the first shift region on a low speed side, the shift stage display may be switched at a timing based on the elapsed time since the point of time at which the inertia phase has started, and where the downshifting performed in the downshift control belongs to the second shift region on a high speed side, the shift stage display may be switched at a timing based on the ratio (V1/Vmax) of the increase amount of the turbine revolution speed from the point of time at which the inertia phase has started.

Further, in the above-described embodiments, the case is explained in which the ratio (V1/Vmax) of the variation amount (V1) of the input revolution speed in the course of the shift operation to the variation amount (Vmax) of the input revolution speed in the period of time (entire period of time of the shift operation) from the point of time at which the decrease or increase of the input revolution speed caused by the automatic shift control has started to the point of time at which it ends is taken as the "variation amount of the input revolution speed" since the point of time at which the decrease or increase of the input revolution speed has started, but this specific example of the "variation amount of the input revolution speed" is not limiting. For example, the variation amount of the input revolution speed itself, or the variation amount of the shift ratio (output revolution speed/input revolution speed) corresponding thereto, and the ratio of the variation amount of the shift ratio may be used as the "variation amount of the input revolution speed".

Further, in the above-described embodiments, the case is explained in which both the "elapsed time" since the point of time at which the decrease or increase of the input revolution speed caused by the automatic shift control has started and the "variation amount of the input revolution speed" since the aforementioned point of time, are used as the "input revolution speed correlation value" changing in the course of shifting in the automatic transmission, but the switch timing of the shift stage display may be also controlled by using either the "elapsed time" or the "variation time of the input revolution speed". In this case, the set value of the "elapsed time" is preferably set to a time that is shorter at a higher shift stage before the shifting, and the set value of the "variation amount of the input revolution speed" is preferably set to a value that is larger at a higher shift stage before the shifting. As a result, the shift stage display can be switched at a timing at which the driver is not given an uncomfortable feeling when the shifting is performed in all of the shift regions with different advance rates of the shift operation.

Furthermore, in the above-described embodiments, a multistep automatic transmission equipped with a mechanism for stepwise switching of the shift ratio is explained, but the present invention can be also similarly applied to a stepless transmission (CVT) equipped with a mechanism for continually varying the shift ratio, provided that it is an automatic transmission in which switching can be performed between the manual shift mode and the automatic shift mode.

Summary of the Embodiments

Finally, the specific features disclosed in the embodiments and the operation effects based thereon are summarized.

The technique disclosed in the embodiments relates to a control method for an automatic transmission capable of performing switching between an automatic shift mode in which shifting is automatically performed according to a travel state of a vehicle, and a manual shift mode in which shifting is performed by a shift operation of a driver. This method includes an automatic shift step of executing automatic shift control by which shifting is automatically performed, regardless of the shift operation of the driver, when a predetermined condition is fulfilled in a state in which the manual shift mode is executed; a cancellation step of canceling a shift performed by a shift operation for performing shifting in the same direction as that of the shifting performed by the automatic shift control, when the shift operation is performed before an input revolution speed correlation value that varies as the shifting of the automatic transmission advances becomes a predetermined value, which has been set in advance as a value at the time the driver recognizes the shifting, after the automatic shift control has been started; a first display switching step of switching a shift stage display at a timing at which the shift operation that is to be canceled in the cancellation step has been performed, following the execution of the cancellation step; and a second display switching step of switching the shift stage display at a timing at which the input revolution speed correlation value becomes the predetermined value when a shift operation is not performed within a period of time from when the automatic shift control is started till when the input revolution speed correlation value becomes the predetermined value.

With such a method, the shift performed by a shift operation is canceled, even if the shift operation for performing shifting in the same direction as that of the shifting performed by the automatic shift control is performed within a period of time from when the automatic shift control is started till when the input revolution speed correlation value of the automatic transmission becomes the predetermined value (a value at the time the driver recognizes the shifting). Therefore, when the driver performs a shift operation without being aware of the shifting performed by the automatic shift control, the shifting by the shift operation and the shifting by the automatic shift control can be prevented from being performed redundantly. As a result, the execution of two-stage upshifting or downshifting contrary to the driver's intention can be prevented.

Further, when the shift by the shift operation is thus canceled, the shift stage display is switched at the timing of the shift operation, rather than at the timing of the automatic shift control. Therefore, the driver can be prevented from having an uncomfortable feeling by the switching of the shift stage display.

Meanwhile, when a shift operation is not performed within a period of time from when the automatic shift control is started till when the input revolution speed correlation value of the automatic transmission becomes the predetermined value, the shift stage display is switched at a timing at which the input revolution speed correlation value becomes the predetermined value, that is, at the timing at which the diver recognizes the shifting. Therefore, an uncomfortable feeling provided to the driver can be inhibited even when the shift stage display is switched following the shifting unintended by the driver.

In the above-described method, it is preferred that the cancellation step be executed and shifting based on the shift operation be executed after the cancellation step, when the shift operation for performing shifting in the same direction as that of the shifting performed by the automatic shift control is performed within a period of time from when the automatic shift control is started till when the input revolution speed correlation value becomes the predetermined value.

With such a configuration, when a shift operation for performing shifting in the same direction as that of the shifting performed by the automatic shift control and the second and subsequent shift operations for performing shifting in the same direction as that of the aforementioned shift operation or a direction opposite thereto are performed within a period of time from when the automatic shift control is started till when the input revolution speed correlation value becomes the predetermined value, only the shifting by the first shift operation is canceled and the shifting by the second and subsequent shift operations is executed. Therefore, the shifting according to the driver's intention can be realized. For example, where the driver performs a plurality of shift operations by intentionally upshifting or downshifting through two or more stages after the automatic shift control has been started and before the input revolution speed correlation value becomes the predetermined value, the shifting through two or more stages corresponding to the driver's intention can be realized while cancelling the shifting by the first shift operation.

In the above-described method, it is preferred that an elapsed time since a point of time at which a decrease or increase of an input revolution speed caused by the automatic shift control has started and a variation amount of the input revolution speed after this point of time be used as the input revolution speed correlation value. In the second display switching step, the shift stage display is switched when one of the following conditions is fulfilled: the elapsed time reaches a predetermined value and the variation amount reaches a predetermined value.

The general concept of the "variation amount of the input revolution speed" as used in the present description includes not only the variation amount of the input revolution speed itself, but also the variation amount of the shift ratio (output revolution speed/input revolution speed) corresponding thereto. Further, the "variation amount of the input revolution speed" may also be the ratio (V1/Vmax) of the variation amount (V1) of the input revolution speed in the course of the shift operation to the variation amount (Vmax) of the input revolution speed in the period of time (entire period of time of the shift operation) from the point of time at which the decrease or increase of the input revolution speed has started to the point of time at which it ends, or the ratio of the variation amount of the shift ratio corresponding thereto.

As a result, where a shift operation is not performed after the automatic shift control has been started, the shift stage display is switched when one of the following conditions is fulfilled: an elapsed time since a point of time at which a decrease or increase of an input revolution speed caused by the automatic shift control has started reaches a predetermined value, and a variation amount of the input revolution speed after this point of time reaches a predetermined value. Since the shift stage display is thus switched at the fulfillment timing of the condition that is fulfilled earlier from among the two abovementioned conditions, the shift stage display can be switched at the advantageous timing at which the driver can recognize the upshift, without any delay, in all of the shift regions with different advance rates of the shift operation and the driver can be even more effectively prevented from being given an uncomfortable feeling.

In the above-described method, it is preferred that an elapsed time since a point of time at which a decrease or increase of an input revolution speed caused by the automatic shift control has started and a variation amount of the input revolution speed after this point of time be used as the input revolution speed correlation value; where the automatic shift control is executed in a preset first shift region, the shift stage display be switched when the elapsed time reaches a predetermined value in the second display switching step; and where the automatic shift control is executed in a second shift region with a higher shift stage than the first shift region, the shift stage display be switched when the variation amount reaches a predetermined value in the second display switching step.

In the first shift region with comparatively low shift stages, the shift operation requires a comparatively long time due to a high torque, and therefore the input revolution speed changes gradually following the shift operation. Accordingly, when the automatic shift control is performed in the first shift region, the shift stage display is switched at a timing based on the elapsed time, rather than on the variation amount of the input revolution speed. Conversely, in the second shift region with comparatively high shift stages, the shift operation is completed relatively quickly due to a low torque, and therefore the shift operation rapidly changes the input revolution speed. Accordingly, when the automatic shift control is performed in the second shift region, the shift stage display is switched at a timing based on the variation amount of the input revolution speed, rather than on the elapsed time. As a result, the driver can be more effectively prevented from having an uncomfortable feeling.

The technique of the embodiments also relates to an automatic transmission system including: an automatic transmission capable of performing switching between an automatic shift mode in which shifting is automatically performed according to a travel state of a vehicle, and a manual shift mode in which shifting is performed by a shift operation of a driver; a display device that displays a shift stage when the manual shift mode is executed; a shift operation detection device that detects the shift operation of the driver; an input revolution speed correlation value detection device that detects an input revolution speed correlation value that varies as the shifting of the automatic transmission advances; and a controller that controls the automatic transmission and the display device. The controller is configured to execute: a process of controlling the automatic transmission so as to execute automatic shift control by which shifting is automatically performed, regardless of the shift operation of the driver, when a predetermined condition is fulfilled in a state in which the manual shift mode is executed; a process of controlling the automatic transmission so as to cancel the shift performed by a shift operation for performing shifting in the same direction as that of the shifting performed by the automatic shift control, when the shift operation is performed before the input revolution speed correlation value becomes a predetermined value, which has been set in advance as a value at the time the driver recognizes the shifting, after the automatic shift control has been started; a process of controlling the display device so as to switch a shift stage display at a timing at which the shift operation that is to be canceled has been performed, following the shift cancellation process; and a process of controlling the display device so as to switch the shift stage display at a timing at which the input revolution speed correlation value becomes the predetermined value when a shift operation is not performed within a period of time from when the automatic shift control is started till when the input revolution speed correlation value becomes the predetermined value.

With such a system, the controller controls the automatic transmission so that the shift performed by a shift operation is canceled, even if the shift operation for performing shifting in the same direction as that of the shifting performed by the automatic shift control is performed within a period of time from when the automatic shift control is started till when the input revolution speed correlation value of the automatic transmission becomes the predetermined value (a value at the time the driver recognizes the shifting). Therefore, when the driver performs a shift operation without being aware of the shifting performed by the automatic shift control, the shifting by the shift operation and the shifting by the automatic shift control can be prevented from being performed redundantly. As a result, the execution of two-stage upshifting or downshifting contrary to the driver's intention can be prevented.

Further, when the shift by the shift operation is thus canceled, the controller controls the display device so that the shift stage display is switched at the timing of the shift operation, rather than at the timing of the automatic shift control. Therefore, the driver can be prevented from having an uncomfortable feeling by the switching of the shift stage display.

Meanwhile, when a shift operation is not performed within a period of time from when the automatic shift control is started till when the input revolution speed correlation value of the automatic transmission becomes the predetermined value, the controller controls the display device so that the shift stage display is switched at the timing at which the input revolution speed correlation value becomes the predetermined value, that is, at the timing at which the diver recognizes the shifting. Therefore, an uncomfortable feeling provided to the driver can be inhibited even when the shift stage display is switched following the shifting unintended by the driver.

INDUSTRIAL APPLICABILITY

As described hereinabove, in accordance with the present invention, the shift stage display can be switched at a timing at which the driver is not given an uncomfortable feeling, while preventing the execution of two-stage shifting contrary to the driver's intention in the course of the automatic shift control in the manual shift mode. Therefore, the present invention can be advantageously used in the production of vehicles with automatic transmission equipped with a manual shift function.

This application is based on Japanese Patent application No. 2012-118850 filed in Japan Patent Office on May 24, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control method for an automatic transmission capable of performing switching between an automatic shift mode in which shifting is automatically performed according to a travel state of a vehicle, and a manual shift mode in which shifting is performed by a shift operation of a driver, the control method comprising:

an automatic shift step of executing automatic shift control by which shifting is automatically performed, regardless of the shift operation of the driver, when a predetermined condition is fulfilled in a state in which the manual shift mode is executed;

a cancellation step of canceling the shift performed by a shift operation for performing shifting in the same direction as that of the shifting performed by the automatic shift control, when the shift operation is performed before an input revolution speed correlation value that varies as the shifting of the automatic transmission advances becomes a predetermined value, which has been set in advance as a value at the time the driver recognizes the shifting, after the automatic shift control has been started;

a first display switching step of switching a shift stage display at a timing at which the shift operation that is to be canceled in the cancellation step has been performed, following the execution of the cancellation step; and a second display switching step of switching the shift stage display at a timing at which the input revolution speed correlation value becomes the predetermined value when a shift operation is not performed within a period of time from when the automatic shift control is started till when the input revolution speed correlation value becomes the predetermined value.

2. The control method for an automatic transmission according to claim 1, wherein the cancellation step is executed and shifting based on the shift operation is executed after the cancellation step, when the shift operation for performing shifting in the same direction as that of the shifting performed by the automatic shift control is performed within a period of time from when the automatic shift control is started till when the input revolution speed correlation value becomes the predetermined value.

3. The control method for an automatic transmission according to claim 1, wherein an elapsed time since a point of time at which a decrease or increase of an input revolution speed caused by the automatic shift control has started and a variation amount of the input revolution speed after this point of time, are used as the input revolution speed correlation value, and in the second display switching step, the shift stage display is switched when one of the following conditions is fulfilled: the elapsed time reaches a predetermined value and the variation amount reaches a predetermined value.

4. The control method for an automatic transmission according to claim 1, wherein an elapsed time since a point of time at which a decrease or increase of an input revolution speed caused by the automatic shift control has started and a variation amount of the input revolution speed after this point of time, are used as the input revolution speed correlation value, where the automatic shift control is executed in a preset first shift region, the shift stage display is switched when the elapsed time reaches a predetermined value in the second display switching step, and where the automatic shift control is executed in a second shift region with a higher shift stage than the first shift region, the shift stage display is switched when the variation amount reaches a predetermined value in the second display switching step.

5. The control method for an automatic transmission according to claim 2, wherein an elapsed time since a point of time at which a decrease or increase of an input revolution speed caused by the automatic shift control has started and a variation amount of the input revolution speed after this point of time, are used as the input revolution speed correlation value, and in the second display switching step, the shift stage display is switched when one of the following conditions is fulfilled: the elapsed time reaches a predetermined value and the variation amount reaches a predetermined value.

6. The control method for an automatic transmission according to claim 2, wherein an elapsed time since a point of time at which a decrease or increase of an input revolution speed caused by the automatic shift control has started and a variation amount of the input revolution speed after this point of time, are used as the input revolution speed correlation value, where the automatic shift control is executed in a preset first shift region, the shift stage display is switched when the elapsed time reaches a predetermined value in the second display switching step, and where the automatic shift control is executed in a second shift region with a higher shift stage than the first shift region, the shift stage display is switched when the variation amount reaches a predetermined value in the second display switching step.

7. An automatic transmission system comprising:

an automatic transmission capable of performing switching between an automatic shift mode in which shifting is automatically performed according to a travel state of a vehicle, and a manual shift mode in which shifting is performed by a shift operation of a driver;

a display device that displays a shift stage when the manual shift mode is executed;

a shift operation detection device that detects the shift operation of the driver;

an input revolution speed correlation value detection device that detects an input revolution speed correlation value that varies as the shifting of the automatic transmission advances; and a controller that controls the automatic transmission and the display device, wherein the controller is configured to execute:

a process of controlling the automatic transmission so as to execute automatic shift control by which shifting is automatically performed, regardless of the shift operation of the driver, when a predetermined condition is fulfilled in a state in which the manual shift mode is executed;

a process of controlling the automatic transmission so as to cancel the shift performed by a shift operation for performing shifting in the same direction as that of the shifting performed by the automatic shift control, when the shift operation is performed before the input revolution speed correlation value becomes a predetermined value, which has been set in advance as a value at the time the driver recognizes the shifting, after the automatic shift control has been started;

a process of controlling the display device so as to switch a shift stage display at a timing at which the shift operation that is to be canceled has been performed, following the shift cancellation process; and a process of controlling the display device so as to switch the shift stage display at a timing at which the input revolution speed correlation value becomes the predetermined value when a shift operation is not performed within a period of time from when the automatic shift control is started till when the input revolution speed correlation value becomes the predetermined value.

* * * * *